United States Patent
Jasinski

(10) Patent No.: US 11,599,609 B2
(45) Date of Patent: Mar. 7, 2023

(54) SYSTEM, DEVICE AND METHOD FOR FINGERPRINT AUTHENTICATION USING A WATERMARKED DIGITAL IMAGE

(71) Applicant: MOTOROLA SOLUTIONS, INC., Chicago, IL (US)

(72) Inventor: Marcin Jasinski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 360 days.

(21) Appl. No.: 16/646,397

(22) PCT Filed: Sep. 28, 2017

(86) PCT No.: PCT/PL2017/050050
§ 371 (c)(1),
(2) Date: Mar. 11, 2020

(87) PCT Pub. No.: WO2019/066668
PCT Pub. Date: Apr. 4, 2019

(65) Prior Publication Data
US 2020/0279031 A1    Sep. 3, 2020

(51) Int. Cl.
*G06V 40/13*    (2022.01)
*G06F 21/32*    (2013.01)
(Continued)

(52) U.S. Cl.
CPC .............. *G06F 21/32* (2013.01); *G06F 21/36* (2013.01); *G06T 1/005* (2013.01); *G06V 40/13* (2022.01);
(Continued)

(58) Field of Classification Search
CPC ...................................................... G06V 40/13
See application file for complete search history.

(56) References Cited

U.S. PATENT DOCUMENTS

| 5,420,936 A | 5/1995 | Fitzpatrick et al. |
| 6,862,687 B1 | 3/2005 | Suzuki |
(Continued)

OTHER PUBLICATIONS

Jain, Anil K., "Hiding Biometric Data", IEEE Transactions on Pattern Analysis and Machine Intelligence, IEEE Computer Society, USA, vol. 25, No. 11, Nov. 1, 2003.
(Continued)

*Primary Examiner* — Joseph R Haley
(74) *Attorney, Agent, or Firm* — Perry + Currier, Inc.

(57) ABSTRACT

A system, device and method for fingerprint authentication using a watermarked digital image is provided. A device includes a display device including a touch screen configured to detect fingerprints; and, a controller. The controller: generates, at the display device, an image that includes, in one or more given areas, image-embedded fingerprint information; detects, at one or more portions of the touch screen respectively corresponding to the one or more given areas, user-fingerprint information representing a fingerprint; implements a comparison between the user-fingerprint information and the image-embedded fingerprint information; and when the comparison between the user-fingerprint information and the image-embedded fingerprint information is successful, implement an access process.

17 Claims, 20 Drawing Sheets

(51) Int. Cl.
*G06F 21/36* (2013.01)
*G06T 1/00* (2006.01)
*G06V 40/12* (2022.01)

(52) U.S. Cl.
CPC .. *G06V 40/1365* (2022.01); *G06T 2201/0052* (2013.01)

(56) References Cited

U.S. PATENT DOCUMENTS

| | | |
|---|---|---|
| 9,053,351 B2 | 6/2015 | Boshra et al. |
| 2001/0025342 A1* | 9/2001 | Uchida ................ H04L 9/3231 713/186 |
| 2002/0029341 A1 | 3/2002 | Juels et al. |
| 2005/0063562 A1 | 3/2005 | Brunk et al. |
| 2005/0069179 A1* | 3/2005 | Hwang ................ G06V 10/993 382/124 |
| 2011/0032074 A1 | 2/2011 | Novack et al. |
| 2013/0129162 A1 | 5/2013 | Cheng et al. |
| 2015/0036065 A1 | 2/2015 | Yousefpor et al. |
| 2016/0007194 A1* | 1/2016 | Shim ...................... G06F 21/36 455/411 |
| 2016/0364600 A1 | 12/2016 | Shah et al. |

OTHER PUBLICATIONS

"International Search Report and Written Opinion", issued in corresponding PCT Application No. PCT/PL2017/050050, Filed Sep. 28, 2017, Entitled: System, Device and Method for Fingerprint Authentication Using a Watermarked Digital Image.

* cited by examiner

SYSTEM, DEVICE AND METHOD FOR FINGERPRINT AUTHENTICATION USING A WATERMARKED DIGITAL IMAGE

BACKGROUND OF THE INVENTION

The popularity of fingerprint authentication techniques has increased especially in mobile device applications, however using a fingerprint as the only factor for authentication may be risky, and further may be vulnerable to some spoofing attacks. Furthermore, the usual two-factor authentication techniques, which increases security of the fingerprints may reduce convenience and the ease of usage of fingerprint authentication; for example, the receipt of a code to be entered with the fingerprint takes time and requires network access.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
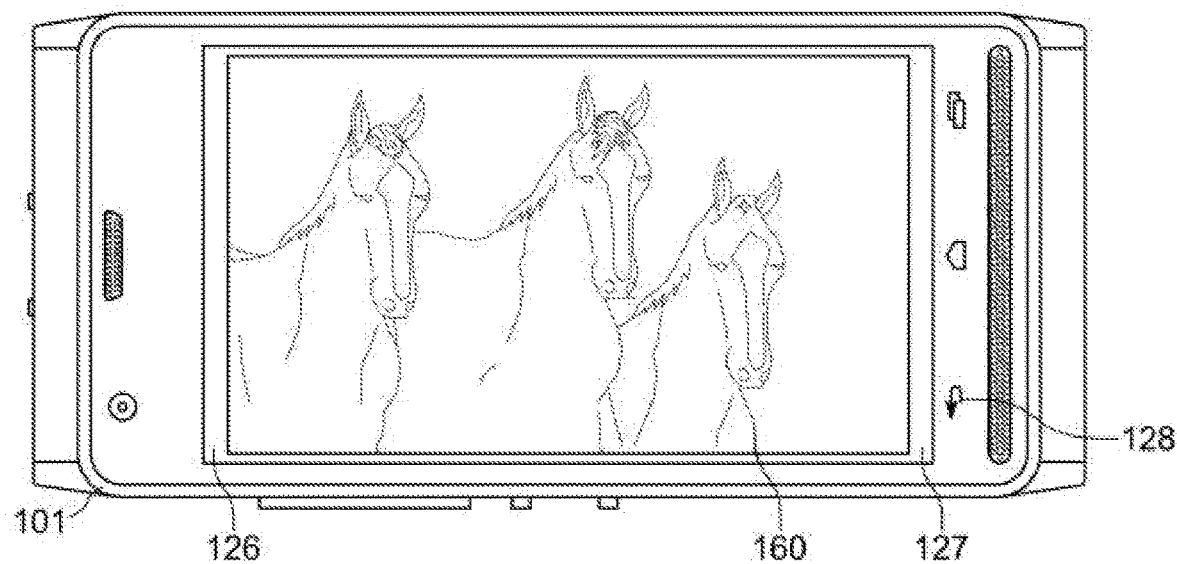
FIG. 1 is a perspective view of a device configured for fingerprint authentication using a watermarked digital image accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a display device including a touch screen configured to detect fingerprints; and, a controller configured to: generate, at the display device, an image that includes, in one or more given areas, image-embedded fingerprint information; detect, at one or more portions of the touch screen respectively corresponding to the one or more given areas, user-fingerprint information representing a fingerprint; implement a comparison between the user-fingerprint information and the image-embedded fingerprint information; and when the comparison between the user-fingerprint information and the image-embedded fingerprint information is successful, implement an access process.

Another aspect of the specification provides a method comprising: generating, using a controller, at a display device, an image that includes, in one or more given areas, image-embedded fingerprint information, the display device including a touch screen configured to detect fingerprints; detecting, at one or more portions of the touch screen respectively corresponding to the one or more given areas, user-fingerprint information representing a fingerprint; implementing, using the controller, a comparison between the user-fingerprint information and the image-embedded fingerprint information; and when the comparison between the user-fingerprint information and the image-embedded fingerprint information is successful, implementing, using the controller, an access process.

Figure 2:
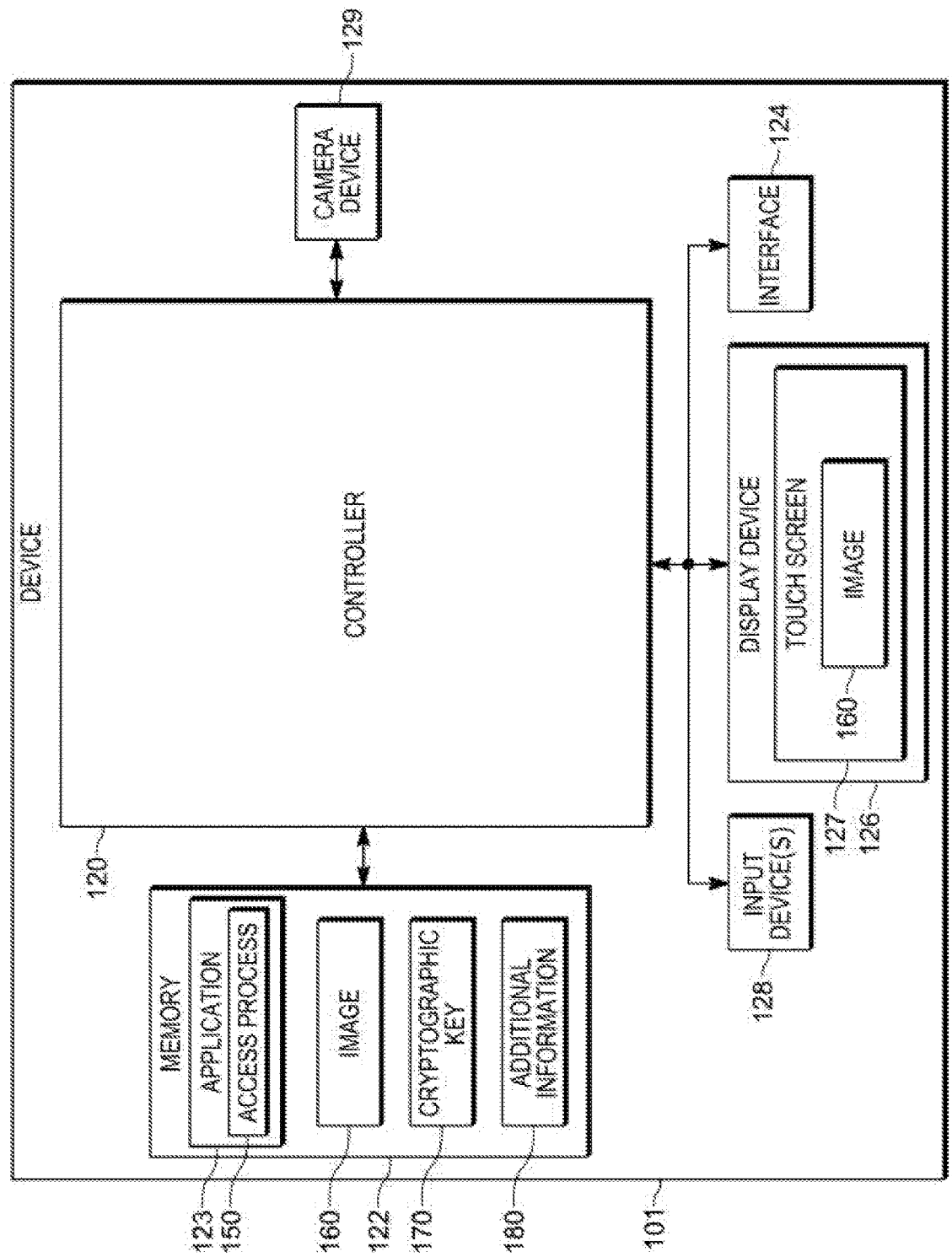
FIG. 2 is a schematic diagram of the device of FIG. 1 in accordance with some embodiments.

Attention is directed to FIG. 1, which depicts a perspective view of a device 101 and FIG. 2 which depicts a schematic block diagram of the device 101. With reference to FIG. 2, the device 101 includes: a controller 120, a memory 122 (storing an application 123), a communication interface 124 (interchangeably referred to the interface 124), a display device 126, including a touch screen 127 configured to detect fingerprints, and at least one input device 128 (interchangeably referred to the input device 128). As depicted, the device 101 further comprises a camera device 129

As also depicted in FIG. 2, the application 123 includes an access process 150. Further, as also depicted in FIG. 2, the memory 122 may store an image 160. The image 160 generally comprises a digital image, such as a "JPEG" image, and the like, and may be any image generated at the device 101 using the camera device 129 and/or received at the device 101, for example in a message, an email, and the like, and/or using a browser application (not depicted), and the like. The image 160 may alternatively comprise one or more frames of a video.

The display device 126, the touch screen 127 and the input device 128 are also depicted in FIG. 1, and the display device 126 is being controlled to generate and/or provide and/or render the image 160.

As depicted, the device 101 generally comprises a mobile device which includes, but is not limited to, any suitable combination of electronic devices, communication devices, computing devices, portable electronic devices, mobile computing devices, portable computing devices, tablet computing devices, laptop computers, telephones, PDAs (personal digital assistants), cellphones, smartphones, e-readers, mobile camera devices and the like. Other suitable devices are within the scope of present embodiments including non-mobile devices, any suitable combination of work stations, servers, personal computers, dispatch terminals, operator terminals in a dispatch center, and the like. Indeed, any device at which an access process is to be implemented is within the scope of present embodiments.

In some embodiments, the device 101 is specifically adapted for use as a public safety device and may be deployed and/or managed by a public safety and/or first responder agency including, but not limited to, police organizations, health organizations, intelligence organizations, military organizations, government organizations, and the like.

However, the device 101 may further be adapted for use as a consumer device and/or business device, and the like, and/or may include additional or alternative components related to, for example, telephony, messaging, entertainment, and/or any other components that may be used with computing devices and/or communication devices.

Returning to FIG. 2, the controller 120 includes one or more logic circuits, one or more processors, one or more microprocessors, one or more ASIC (application-specific integrated circuits) and one or more FPGA (field-programmable gate arrays). In some embodiments, the controller 120 and/or the device 101 is not a generic controller and/or a generic device, but a device specifically configured to implement fingerprint authentication using a watermarked digital image functionality. For example, in some embodiments, the device 101 and/or the controller 120 specifically comprises a computer executable engine configured to implement specific functionality for fingerprint authentication using a watermarked digital image.

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 2, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement fingerprint authentication using a watermarked digital image functionality associated with the application 123. In the illustrated example, when the controller 120 executes the application 123, the controller 120 is enabled to: generate, at the display device 126, an image that includes, in one or more given areas, image-embedded fingerprint information; detect, at one or more portions of the touch screen 127 respectively corresponding to the one or more given areas, user-fingerprint information representing a fingerprint; implement a comparison between the user-fingerprint information and the image-embedded fingerprint information; and when the comparison between the user-fingerprint information and the image-embedded fingerprint information is successful, implement the access process 150.

As described below, in some embodiments, when the controller 120 executes the application 123, the controller 120 is further enabled to generate a digital image watermarked with fingerprint information.

As depicted, instructions for the access process 150 is a component of the application 123, however instructions for the access process 150 may be stored separately from the application 123. Embodiments of the access process 150 are described in more detail below, but may include, but are not limited to, one or more of: providing access to a communication device, such as the device 101 and/or another device; providing access to at least a portion of a video; providing access to one or more images; providing access to one or more of documents, files, and the like.

As also depicted in FIG. 2, as depicted the memory 122 stores an optional cryptographic key 170 and/or cryptographic key pair.

As also depicted in FIG. 2, as depicted the memory 122 stores optional additional information 180 which may include, but is not limited to, one or more indications of data, documents, files, images, videos, and the like, and/or a network address thereof, to which access may be granted in some embodiments of the access process 150. In general, the additional information 180 may not include the actual files, images, videos and the like, but rather one or more indicators of where the files, images, videos, and the like are stored and/or accessible.

The interface 124 is generally configured to communicate using wired and/or wired links as desired, including, but not limited to, cables, WiFi links and the like. In other words, the interface 124 is enabled to communicate using any suitable combination of wired networks and/or wireless networks. The interface 124 may be implemented by, for example, one or more radios and/or connectors and/or network adaptors, configured to communicate wirelessly, with network architecture that is used to implement one or more communication channels between the device 101 and a wired and/or wireless network. In some embodiments, the interface 124 includes, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications. In yet further embodiments, the interface 124 includes one or more local area network or personal area network transceivers operating in accordance with an IEEE 902.11 standard (e.g., 902.11a, 902.11b, 902.11g), or a Bluetooth™ transceiver. In some embodiments, the interface 124 is further configured to communicate "radio-to-radio" on some communication channels, while other communication channels are configured to use wireless network infrastructure. Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

The display device 126 comprises any suitable one of, or combination of, flat panel displays (e.g. LCD (liquid crystal display), plasma displays, OLED (organic light emitting diode) displays) and the like, as well as the touch screen 127.

The touch screen 127 is generally configured to detect fingerprints and may comprises any suitable combination of capacitive touch screens and resistive touch screens. However, the touch screen 127 may further include one or more ultrasonic fingerprint readers and/or any other type of fingerprint reader that may be integrated with the display device 126. Hence, regardless of the underlying technology, however, the touch screen 127 is generally configured as a fingerprint reader. Indeed, as will be explained below, when user-fingerprint information representing a fingerprint is received at one or more portions of the touch screen 127, respectively corresponding to one or more given areas of an image being generated at the display device 126 that include image-embedded-fingerprint information, the access process 150 may be implemented.

Figure 3:
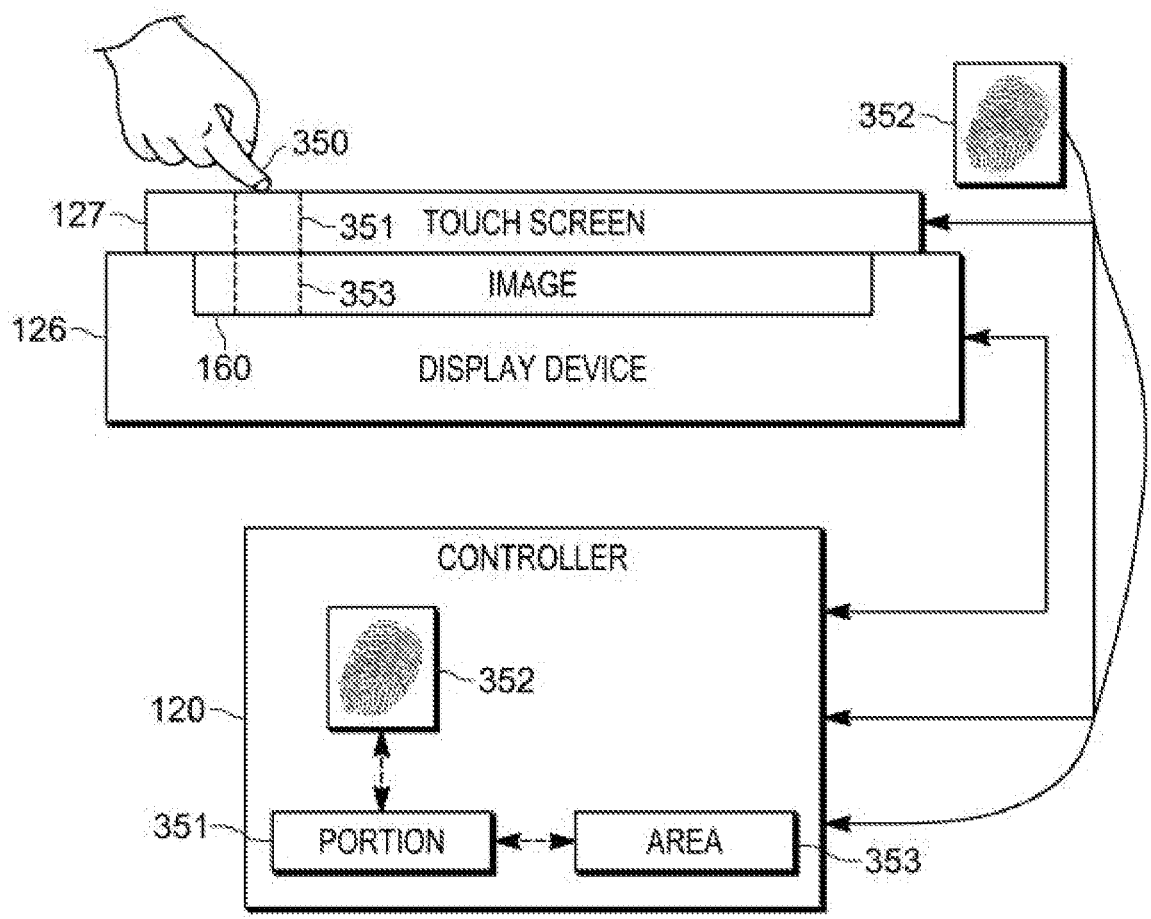
FIG. 3 is a schematic diagram of a touch screen and display device of the device of FIG. 1 in accordance with some embodiments.

Indeed, the controller 120, is generally configured to coordinate receipt of fingerprint data (and/or touch input) at the touch screen 127 with images generated at the display device 126. For example, attention is directed to FIG. 3, which schematically shows a side view of the display device 126, generating the image 160, in relation to the touch screen 127, as well as a finger 350 of a hand (e.g. of a user) touching the touch screen 127. In FIG. 3, the display device 126 and the touch screen 127 are further depicted in communication with the controller 120. In particular, in FIG. 3, the finger 350 is touching a portion 351 of the touch screen, which is detecting user-fingerprint information 352 representing a fingerprint of the finger 350 (the user-fingerprint information 352 interchangeably referred to hereafter as the information 352). Put another way, as depicted, the user-fingerprint information 352 comprises fingerprint data.

Furthermore, the user-fingerprint information 352 is received at the controller 120, which determines that the user-fingerprint information 352 has been received at the portion 351 which corresponds to an area 353 of the image 160 generated at the display device 126. The correspondence between the portion 351 and the area 353 is generally indicated at the controller 120 by a broken arrow therebetween, and furthermore the controller 120 determining that that the user-fingerprint information 352 was received at the portion 351 is generally indicated at the controller 120 by another broken arrow therebetween.

While the information 352 is depicted as a fingerprint in FIG. 3, the information 352 is not necessarily a fingerprint but rather may comprise digital information representing a fingerprint. In other words, the fingerprint data of the information 352 may comprise digital fingerprint data.

Furthermore, while in FIG. 3 the touch screen 127 is depicted as being on a finger-facing side of the display device 126, in other embodiments (e.g. where the touch screen 127 comprises one or more ultrasonic fingerprint readers) the touch screen 127 may be on an opposite side of the display device 126 (e.g. "underneath" the display device 126 relative to the finger 350).

Returning to FIG. 2, the input device 128 comprises any suitable one of, or combination of keyboards, pointing devices, touchpads, buttons, and the like, and/or the touch screen 127. Furthermore, the display device 126 (e.g. with the touch screen 127) and/or the input device 128 may be external to the device 101 and accessible to the device 101 via the interface 124; for example, the display device 126 (e.g. with the touch screen 127) and/or the input device 128 may be components of a portable personal computer.

The camera device 129 may be optional, and may include, but is not limited to, one or more camera devices, video devices, charge coupled devices (CCD) and the like.

While not depicted, the device 101 may further include a battery and/or a power supply and/or a connection to a mains power supply and/or one or more speakers and/or one or more microphones and/or one or more lights and/or one or more haptic devices and/or one or more notification devices.

In any event, it should be understood that a wide variety of configurations for the device 101 are within the scope of present embodiments.

Prior to describing fingerprint authentication using a watermarked digital image, generation of a watermarked digital image will be described in accordance with some embodiments.

Figure 4:
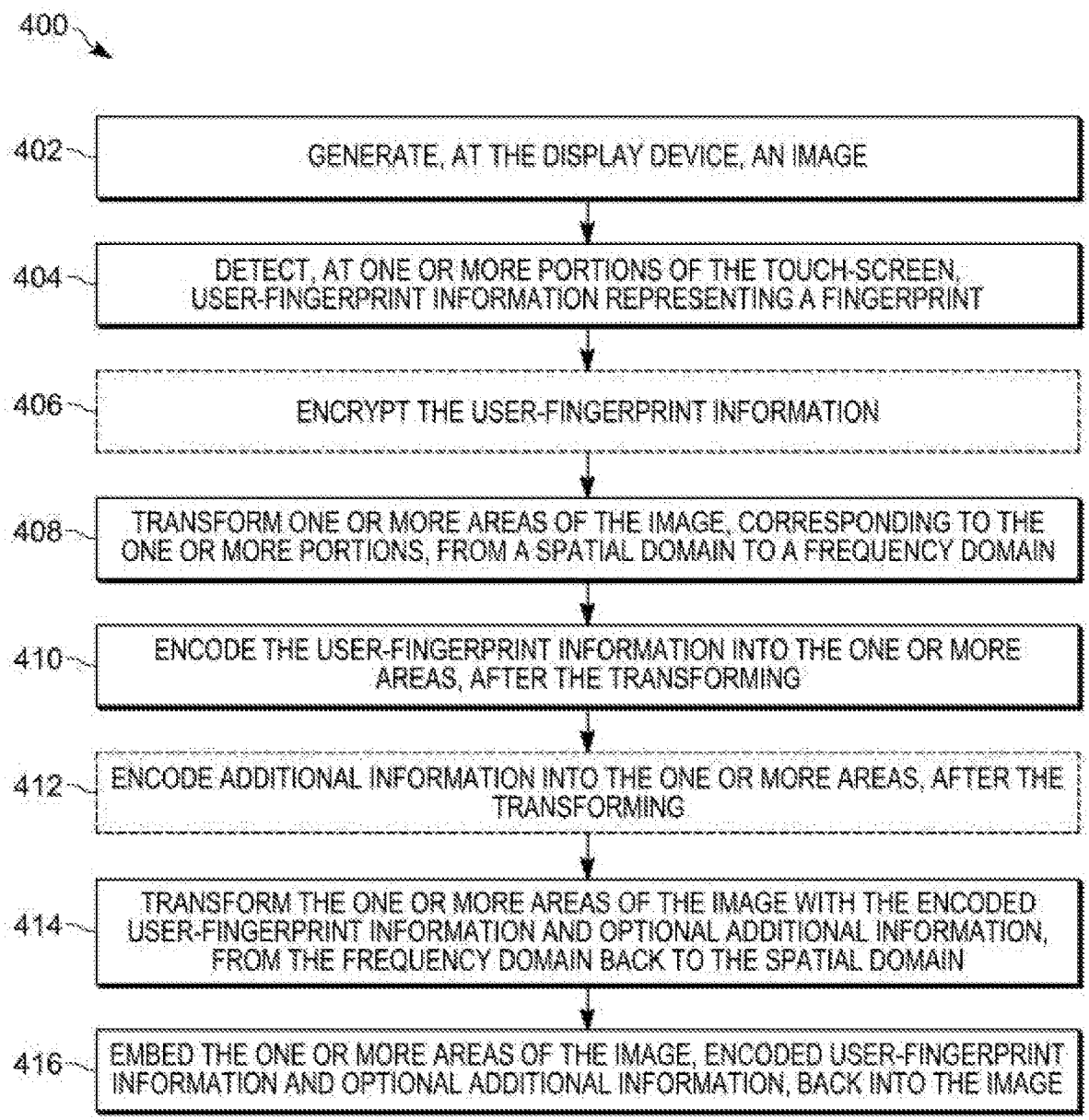
FIG. 4 is a flowchart of a method for generating a fingerprint watermarked digital image accordance in accordance with some embodiments.

Attention is now directed to FIG. 4 which depicts a flowchart representative of a method 400 for generating a digital image watermarked with fingerprint information. In some embodiments, the operations of the method 400 of FIG. 4 correspond to machine readable instructions that are executed by, for example, the device 101 of FIG. 1, and specifically by the controller 120 of the device 101. In the illustrated example, the instructions represented by the blocks of FIG. 4 are stored at the memory 122, for example, as the application 123. The method 400 of FIG. 4 is one way in which the device 101 and/or the controller 120 is configured. Furthermore, the following discussion of the method 400 of FIG. 4 will lead to a further understanding of the device 101, and its various components.

However, it is to be understood that the device 101 and/or the controller 120 and/or the method 400 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At a block 402, the controller 120 generates, at the display device 126, an image.

At a block 404, the controller 120 detects, at one or more portions of the touch screen 127, user-fingerprint information representing a fingerprint.

At an optional block 406, the controller 120 encrypts the user-fingerprint information. The optionality of the block 406 is indicated by the block 406 being in broken lines.

At a block 408, the controller 120 transforms one or more areas of the image, corresponding to the one or more portions, from a spatial domain to a frequency domain using any suitable technique including, but not limited to, discrete cosine transformation.

At a block 410, the controller 120 encodes the user-fingerprint information into the one or more areas, after the transforming of the block 408 using, for example a watermarking process that includes, but is not limited to quantization index modulation.

At an optional block 412, the controller 120 encodes additional information (e.g. additional information 180) into the one or more areas, after the transforming of the block 408, using the watermarking process. The block 412, when implemented, may be implemented in conjunction with the block 410. The optionality of the block 412 is indicated by the block 412 being in broken lines.

At a block 412, the controller 120 transforms the one or more areas of the image with the encoded user-fingerprint information and optional additional information, from the frequency domain back to the spatial domain.

At a block 416, the controller 120 embeds the one or more areas of the image, encoded user-fingerprint information and optional additional information, after the transforming of the block 412, back into the image to produce a digital image watermarked with fingerprint information.

The method 400 will now be described with reference to FIG. 5 to FIG. 11.

Figure 5:
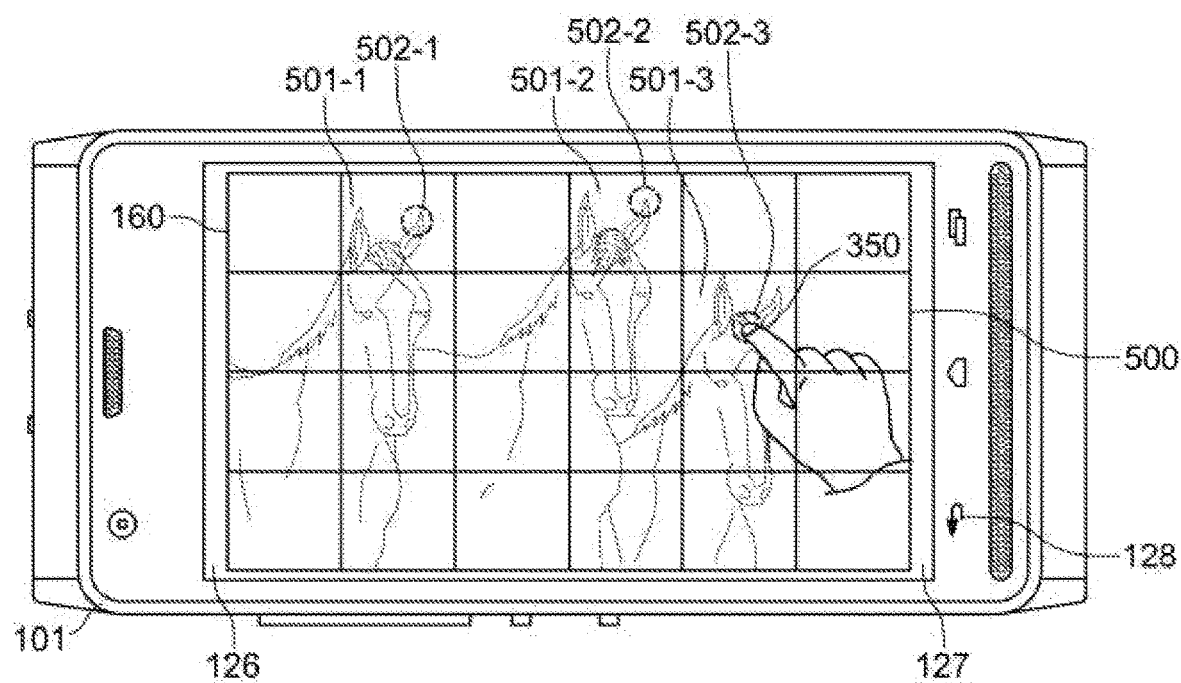
FIG. 5 depicts the device of FIG. 1 detecting a fingerprint at different regions of an image in accordance with some embodiments.

Attention is next directed to FIG. 5, which is substantially similar to FIG. 1, with like elements having like numbers. In general, FIG. 5 represents an example embodiment of the blocks 402, 404 of the method 400. However, in FIG. 5, the display device 126 is being controlled (e.g. by the controller 120) to generate the image 160 (e.g. at the block 402) with an optional grid 500 overlaid on the image 160, the grid 500 generally dividing the image 160 into a plurality of areas, including, but not limited to, areas 501-1, 501-2, 501-3 (interchangeably referred to hereafter, collectively, as the areas 501 and, generically, as an area 501). The controller 120 also generally may logically divide the touch screen 127 into portions corresponding to the areas 501.

As depicted, the touch screen 127 has been being touched at three points and/or portions 502-1, 502-2, 502-3 (interchangeably referred to hereafter, collectively, as the portions 502 and, generically, as a portion 502) by the finger 350. In particular, the portions 502-1, 502-2, 502-3 respectively corresponds to and/or are inside the areas 501-1, 501-2, 501-3. Furthermore, at each portion 502 of the touch screen 127, the touch screen 127 detects (e.g. at the block 404) user-fingerprint information (e.g. information 352) representing a fingerprint.

While present example embodiments are described with respect to three areas 501 and/or three portions 502, the number of areas 501 and/or portions 502 touched may be fewer than three areas 501 and/or portions 502, or more than three areas 501 and/or portions 502. Indeed, the number of areas 501 and/or portions 502 touched may be as few as one. Furthermore, the number of areas 501 and/or portions 502 touched may be determined by a user and/or the controller 120 may control the display device 126 (and/or a speaker, and the like) to generate a prompt to touch a given number of areas 501 and/or portions 502.

Additionally, the controller 120 may, in some embodiments, determine an order in which the portions 502 are touched. For example, the portions 502 are touched in a particular sequence and/or order, determined, for example, by a user of the finger 350. The controller 120 generally determines and/or records and the like, the sequence of the portions 502 at which the user-fingerprint information 352 is received. In some embodiments, an indication of the sequence of the portions 502 at which the user-fingerprint information 352 is received may be stored as the additional information 180.

Furthermore, in some embodiments, the grid 500 is not provided. Rather, the controller 120 may set given dimensions of areas 501 around each of the portions 502 based on, for example, a given width and height of an area 501 and/or a given radius and/or diameter. Indeed, the areas 501 need not be rectangular and/or square, and the areas 501 may be of any suitable shape, including, but not limited to generally circular, generally elliptical and the like.

Figure 6:
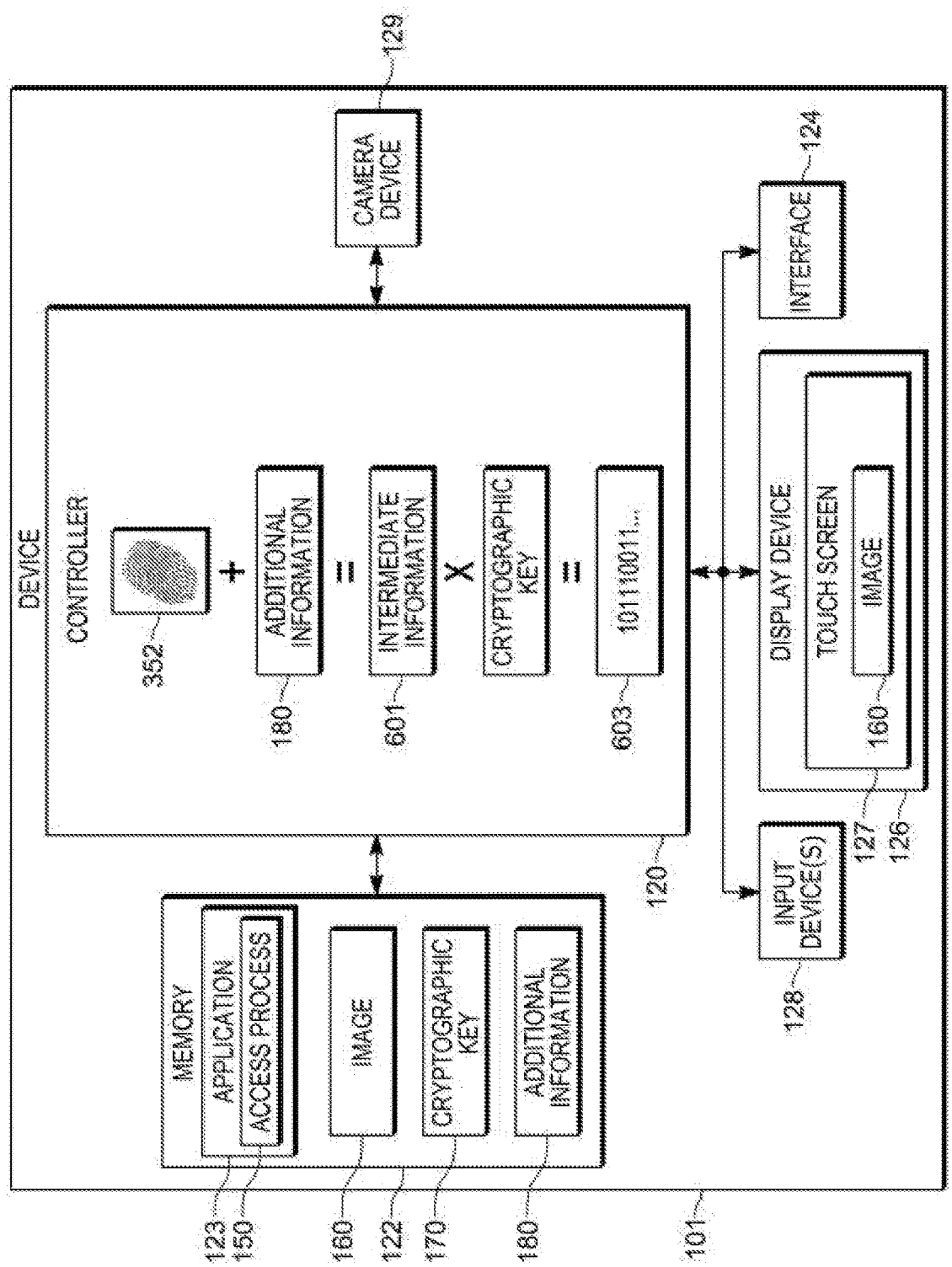
FIG. 6 depicts the device of FIG. 1 encrypting received fingerprint information in accordance with some embodiments.

Attention is next directed to FIG. 6, which is substantially similar to FIG. 2, with like elements having like numbers. In general, FIG. 6 represents an example embodiment of the block 406 of the method 400. As depicted, the controller 120 has received the information 352 and is optionally adding and/or combining the additional information 180 with the information 352 to generate intermediate information 601.

Furthermore, as the finger 350 touched the touch screen 127 three times, the information 352 may be an average of each of three sets of user-fingerprint information generated at each touch of the touch screen 127.

The controller 120 optionally encrypts (e.g. at the block 406) the intermediate information 601 with the cryptographic key 170 to generate encrypted information 603 representing the encrypted user-generated fingerprint information 352.

Alternatively, the additional information 180 is not encrypted and combined with the encrypted information 603 after encryption of the user-generated fingerprint information 352 such that the encrypted information 603 includes an encrypted portion and an unencrypted portion. Regardless, as depicted, the encrypted information 603 is represented digitally as a sequence of 1's and 0's.

Figure 7:
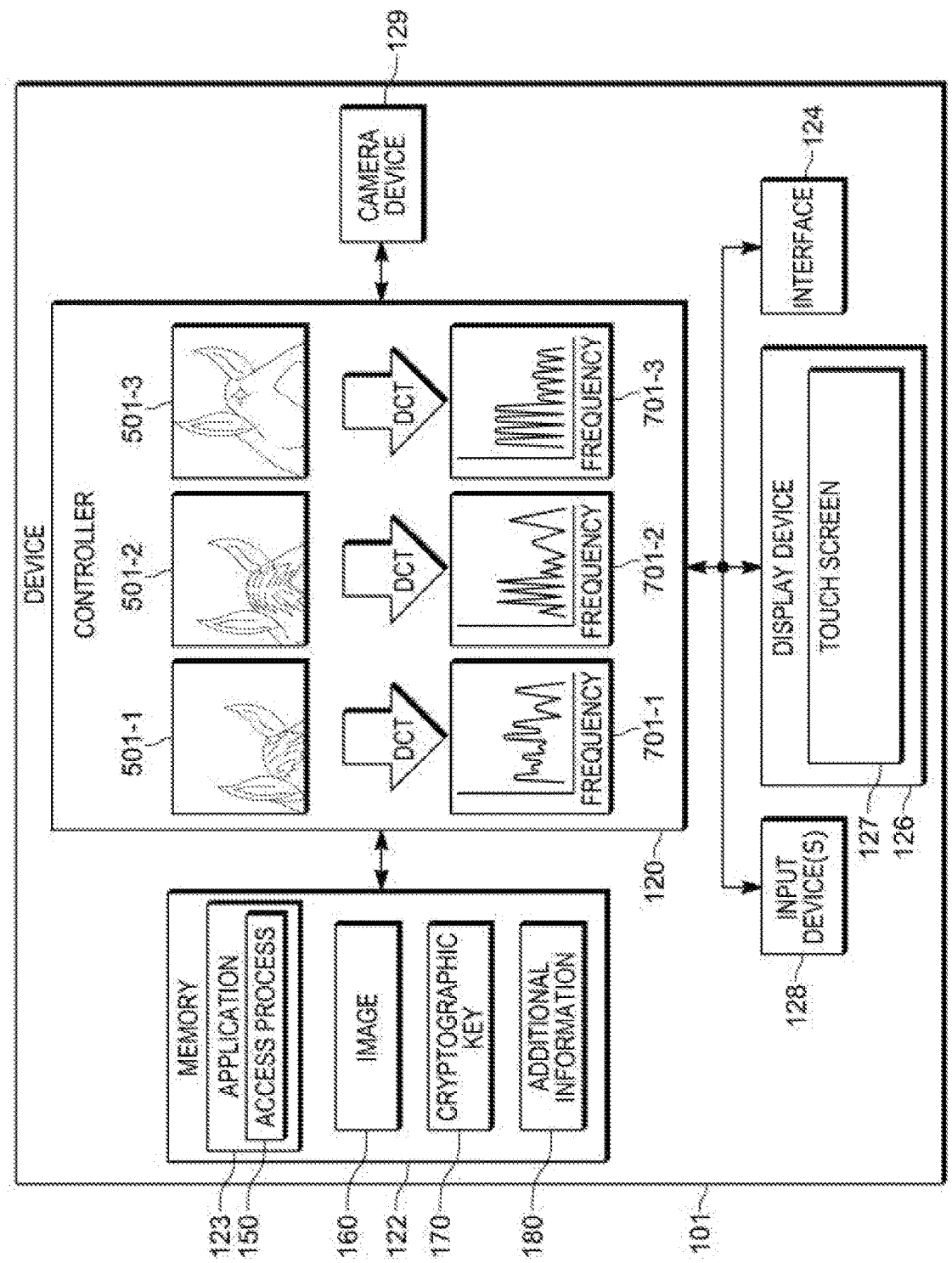
FIG. 7 depicts the device of FIG. 1 transforming each of one or more given areas of an image from a spatial domain to a frequency domain in accordance with some embodiments.

Attention is next directed to FIG. 7, which is substantially similar to FIG. 6, with like elements having like numbers. In general, FIG. 7 represents an example embodiment of the block 408 of the method 400. In FIG. 7 the display device 126 has stopped generating the image 160, however in other embodiments, the display device 126 may continue generating the image 160.

In particular, in FIG. 7, the controller 120 transforms each of the areas 501 of the image 160 from a spatial domain to a frequency domain using, for example, a Fourier transform, a discrete cosine transformation, and the like. Indeed, in particular, example embodiments, the controller 120 transforms (e.g. at the block 408 of the method 400) each of the areas 501 of the image 160 are transformed from a spatial domain to a frequency domain using a discrete cosine transformation (DCT). For example, as depicted, the area 501-1 of the image 160 is transformed from the spatial domain to a frequency-transformed area 701-1 (e.g. schematically represented in FIG. 7 as a graph of frequency vs amplitude) and the like of the area 501-1. The areas 501-2, 501-3 are similarly transformed into frequency-transformed areas 701-2, 701-3 and the like. In example embodiments, other regions of the image 160 are not transformed.

Figure 8:
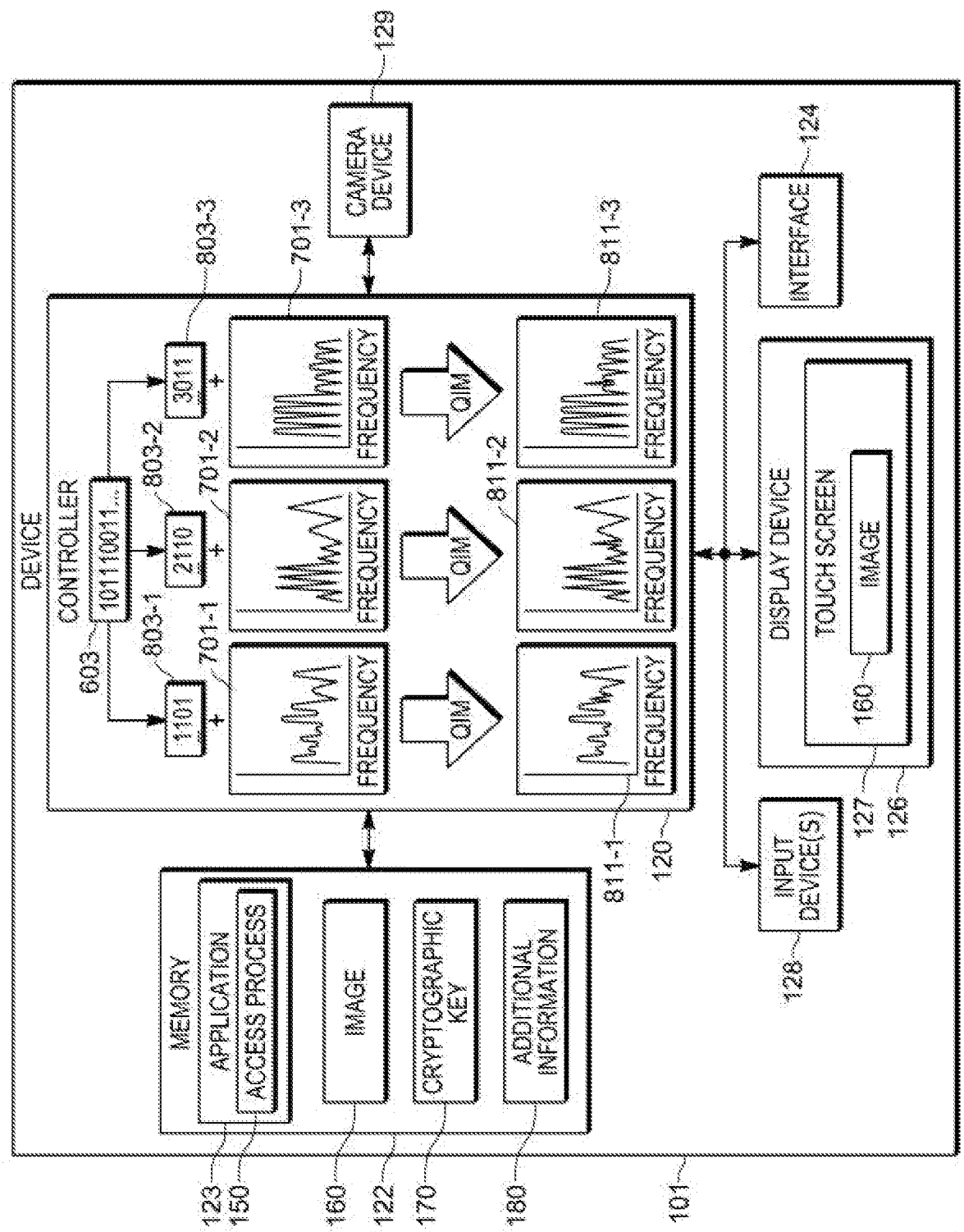
FIG. 8 depicts the device of FIG. 1 encoding the encrypted fingerprint information into each of one or more given areas in accordance with some embodiments.

Attention is next directed to FIG. 8, which is substantially similar to FIG. 7, with like elements having like numbers. In general, FIG. 8 represents an example embodiment of the blocks 410, 412 of the method 400. In particular, in FIG. 8, the controller encodes the frequency-transformed areas 701-1, 701-2, 701-2 with the information 603. For example, as depicted, the information 603 is divided into three portions and/or pieces 803-1, 803-2, 803-3 (interchangeably referred to, collectively, as the pieces 803 and generically as a piece 803). The number of pieces 803 correspond to the number of the areas 501. Hence, for example, the piece 803-1 represents the first third (e.g. "101") of the information 603, the piece 803-2 represents the middle third (e.g. "110") of the information 603, and the piece 803-3 represents the final third (e.g. "011") of the information 603.

Furthermore, each piece 803 further includes a corresponding sequence number in which the user information was received at a corresponding portion 502 of the touch screen 127. For example, as the information 352 was received first at the portion 502-1, which corresponds to the area 501-1, the piece 803-1 includes a number "1" appended to the beginning (the number "1" underlined in FIG. 8 for clarity). Similarly, as the information 352 was received second at the portion 502-2, which corresponds to the area 501-2, the piece 803-2 includes a number "2" (the number "2" underlined in FIG. 8 for clarity). Similarly, as the information 352 was received third at the portion 502-3, which corresponds to the area 501-3, the piece 803-3 includes a number "3" (the number "3" underlined in FIG. 8 for clarity). While each of the numbers of the sequence appended to the beginning of each of the pieces 803 are depicted in a base-ten, in other embodiments, the numbers of the sequence appended to the beginning of each of the pieces 803 may be binary and the like. Furthermore, the numbers of the sequence may be optional and/or may be added anywhere in each of the respective pieces 803.

As also depicted in FIG. 8, the controller 120 encodes (e.g. at the block 410 and optionally at the block 412), the respective pieces 803 into the respective frequency-transformed areas 701. Put another way, as the information 603 represents the user-fingerprint information 352 and, optionally, the additional information 180, and as the frequency-transformed areas 701 represent the areas 501, the encoding of the respective pieces 803 into the respective frequency-transformed areas 701 may also be referred to as encoding the user-fingerprint information 352 (and/or the additional information 180) into the one or more areas 501, as at the block 410 and optionally the block 412.

Figure 9:
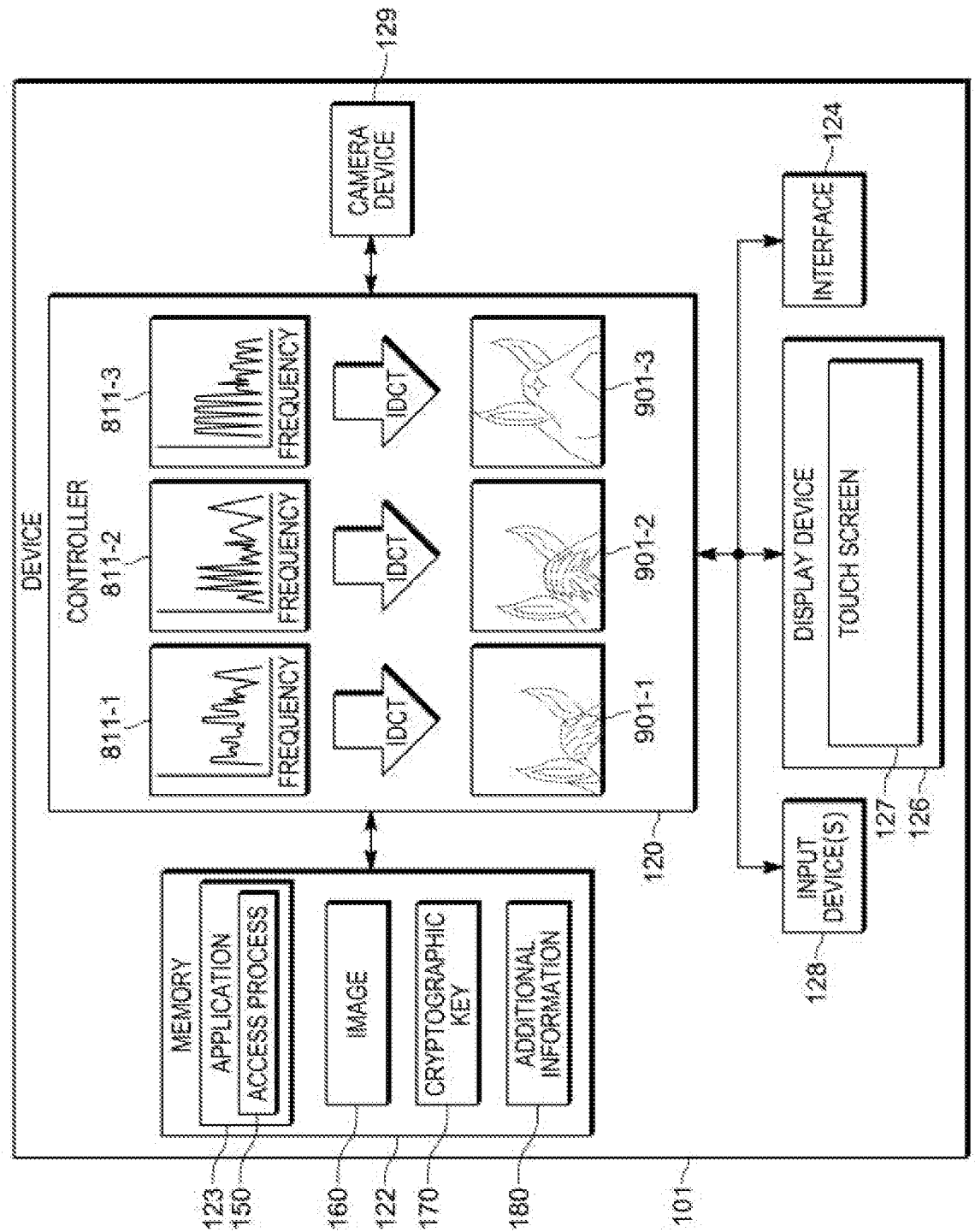
FIG. 9 depicts the device of FIG. 1 transforming each of one or more given areas of an image with the encrypted fingerprint information from the frequency domain back to the spatial domain in accordance with some embodiments.

As depicted, the encoding occurs using an example watermarking technique such as quantization index modulation (QIM) to produce information-encoded frequency-transformed areas 811-1, 811-2, 811-3 (interchangeably referred to, collectively, as the information-encoded frequency-transformed areas 811 and generically as an information-encoded frequency-transformed area 811). However, any suitable watermarking technique and/or digital watermarking technique is within the scope of present embodiments Then, with reference to FIG. 9, which is substantially similar to FIG. 8, with like elements having like numbers, the controller 120 transforms the information-encoded frequency-transformed areas 811 from the frequency domain back to the spatial domain using, for example, the inverse of the transformation technique used at the block 408, for example an inverse discrete cosine transformation (IDCT) to generate encoded areas 901-1, 901-2, 901-3 in the spatial domain. As such FIG. 9 represents an example embodiment of the block 414 of the method 400. The encoded areas 901-1, 901-2, 901-3 are interchangeably referred to, collectively, as the encoded areas 901 and generically as an encoded area 901.

The encoded areas 901 generally appear visually similar as their respective areas 501. Indeed, a suitable digital watermarking technique is one that results in encoding the respective pieces 803 in encoded areas 901 such that the encoded areas 901 appear visually similar to their respective areas 501 to a human and/or to a human visual system (e.g. a machine visual system adapted to visually detect light and/or images similar to an average human visual system).

Put another way, in the example embodiment depicted in FIG. 9, the controller 120 transforms the one or more areas 501 of the image 160 with the encoded user-fingerprint information 352 and optional additional information 180 (e.g. the information-encoded frequency-transformed areas 811), from the frequency domain back to the spatial domain.

Figure 10:
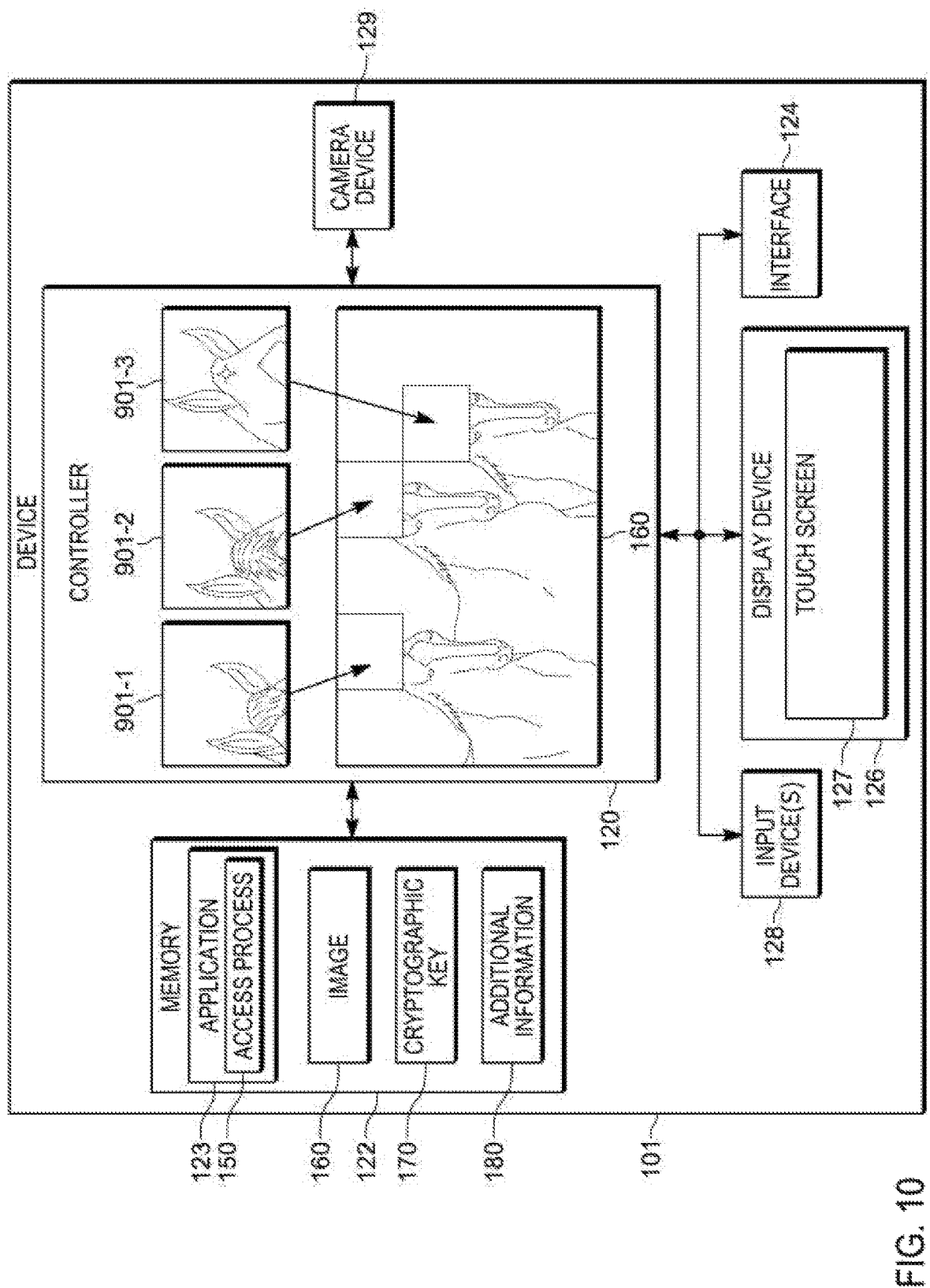
FIG. 10 depicts the device of FIG. 1 embedding the one or more given areas of with the encrypted fingerprint information back into an image in accordance with some embodiments.

Attention is next directed to FIG. 10, which is substantially similar to FIG. 9, with like elements having like numbers. In general, FIG. 10 represents an example embodiment of the block 416 of the method 400. In FIG. 10, the controller 120 is embedding the encoded areas 901 (e.g. with the encoded user-fingerprint information 352 and optional additional information 180) back into the image 160, for example by replacing each of the areas 501 with a respective encoded area 901 to produce a watermarked digital image (e.g. see FIG. 11). Hence, for example, the encoded area 901-1 replaces the respective area 501-1.

Figure 11:
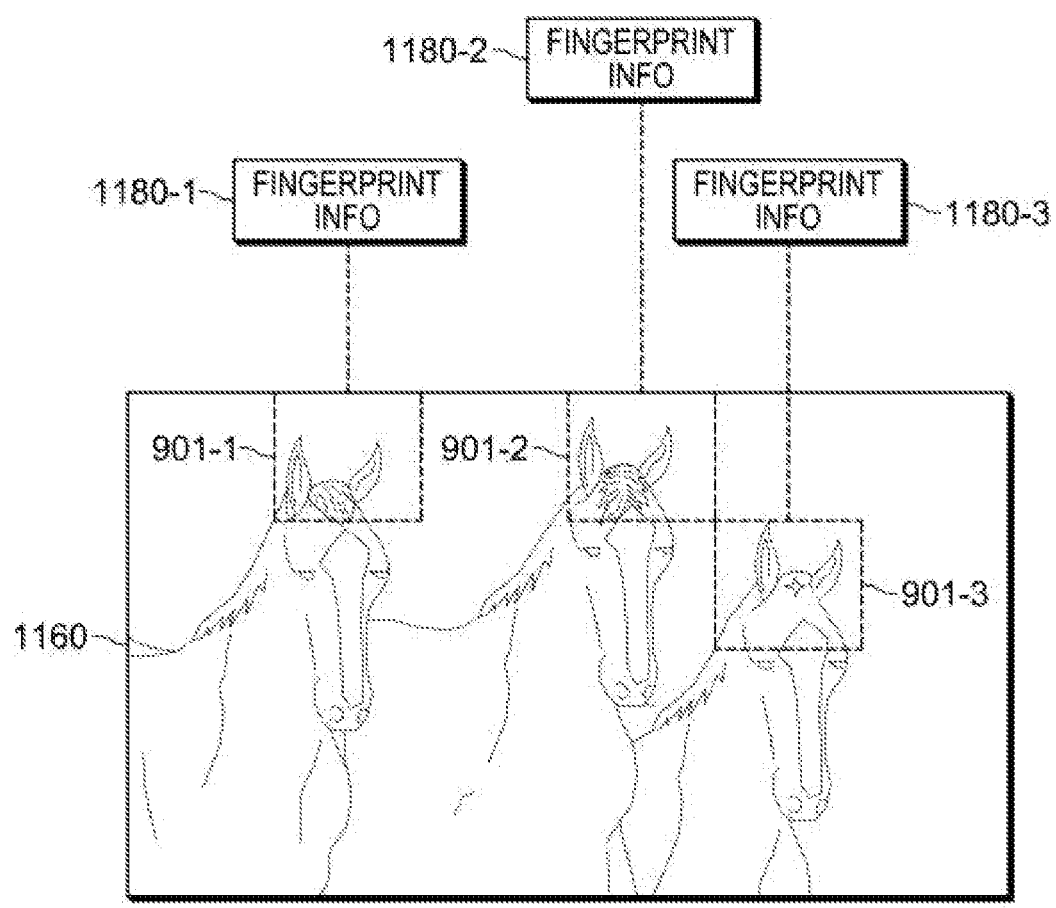
FIG. 11 depicts a watermarked digital image accordance in accordance with some embodiments.

Attention is next directed to FIG. 11 which depicts a resulting watermarked digital image 1160 that includes, in the one or more given areas 901, image-embedded fingerprint information 1180-1, 1180-2, 1180-3 (interchangeably referred to hereafter, collectively, and generically, as the image-embedded fingerprint information 1180. While in FIG. 11 the areas 901 are indicted using a broken outline, the areas 901 are generally indistinguishable from the remaining portion of the image 1160. Furthermore, the image-embedded fingerprint information 1180 each represent the user-fingerprint information 352 and optional additional information 180 (e.g. when present).

Indeed, using the method 400, any image-embedded fingerprint information 1180 may be embedded in the watermarked digital image 1160. For example, in some embodiments, the information 603 is not divided into pieces, and neither is the information 603 encrypted. As such, the image-embedded fingerprint information 1180 may include the user-fingerprint information 352, unencrypted, and without any additional information 180.

As will be described below with reference to FIG. 19 and FIG. 20, in some embodiments, the image-embedded fingerprint information 1180 includes a network address of a computing device where user-finger print information is stored.

Figure 12:
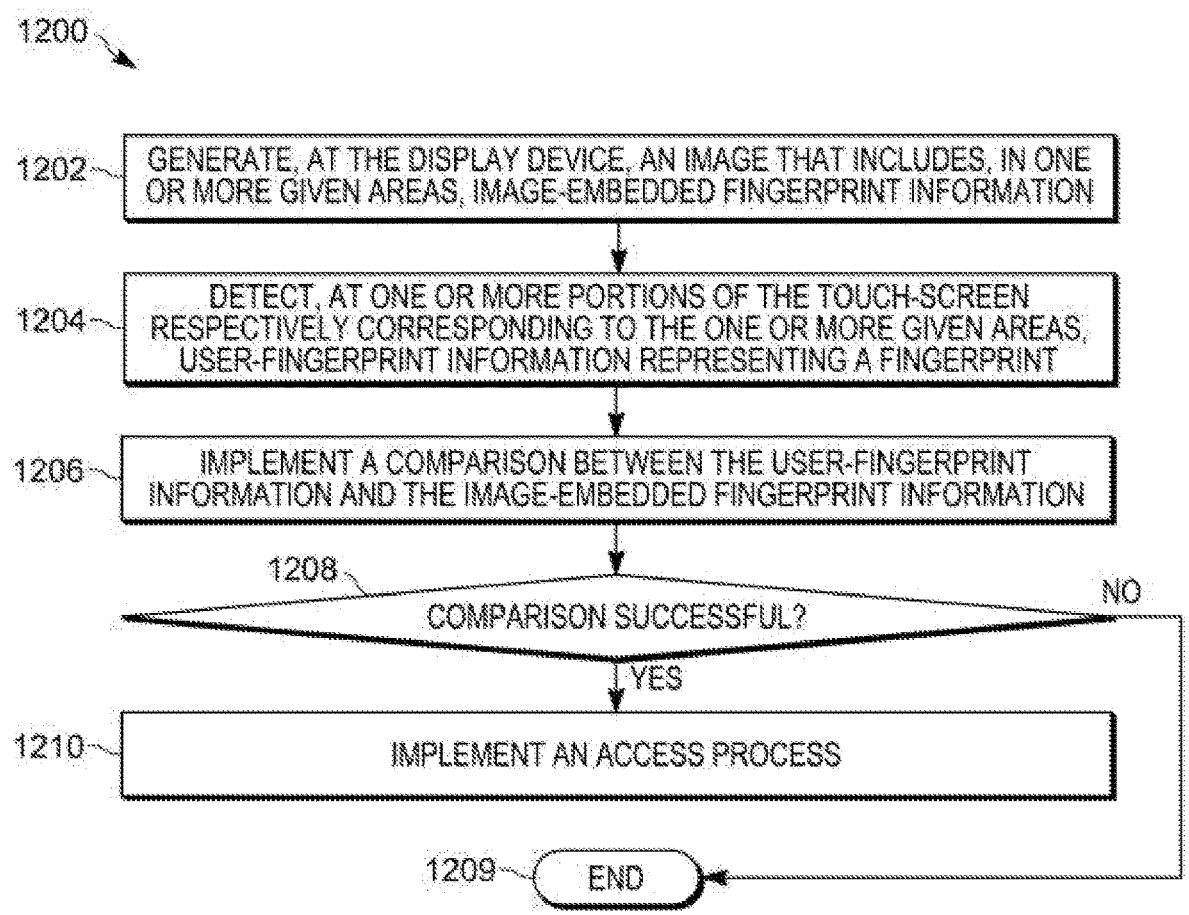
FIG. 12 is a flowchart of a method for fingerprint authentication using a watermarked digital image accordance in accordance with some embodiments.

Attention is now directed to FIG. 12 which depicts a flowchart representative of a method 1200 for fingerprint authentication using a watermarked digital image. In some embodiments, the operations of the method 1200 of FIG. 12 correspond to machine readable instructions that are executed by, for example, the device 101 of FIG. 1, and specifically by the controller 120 of the device 101. In the illustrated example, the instructions represented by the blocks of FIG. 12 are stored at the memory 122, for example, as the application 123. The method 1200 of FIG. 12 is one way in which the device 101 and/or the controller 120 is configured. Furthermore, the following discussion of the method 1200 of FIG. 12 will lead to a further understanding of the device 101, and its various components.

However, it is to be understood that the device 101 and/or the controller 120 and/or the method 1200 may be varied, and need not work exactly as discussed herein in conjunction with each other, and that such variations are within the scope of present embodiments.

Furthermore, the method 1200 of FIG. 12 need not be performed in the exact sequence as shown and likewise various blocks may be performed in parallel rather than in sequence. Accordingly, the elements of method 1200 are referred to herein as "blocks" rather than "steps".

At a block 1202, the controller 120 generates, at the display device 126, an image that includes, in one or more given areas, image-embedded fingerprint information.

At a block 1204, the controller 120 detects, at one or more portions of the touch screen 127 respectively corresponding to the one or more given areas, user-fingerprint information representing a fingerprint.

At a block 1206, the controller 120 implements a comparison between the user-fingerprint information and the image-embedded fingerprint information.

At a block 1208, the controller 120 determines whether the comparison is successful. When the comparison is not successful (e.g. a "NO" decision at the block 1208), the method 1200 ends at the block 1209.

Otherwise, when the comparison between the user-fingerprint information and the image-embedded fingerprint information is successful (e.g. a "YES" decision at the block 1208), at a block 1210, the controller 120 implements an access process.

The method 1200 will now be described with respect to FIG. 13 to FIG. 20. It will be assumed in the following discussion that the watermarked digital image 1160 is stored in the memory 122 of the device 101 and generated at the display device 101, for example when the device 101 is to determine whether the access process 150 is to be implemented or not. It will be further assumed that the image-embedded fingerprint information 1180 is similar to the pieces 803. It is further assumed that, initially, the device 101 is locked and that the method 1200 is used to unlock the device 101.

Figure 13:
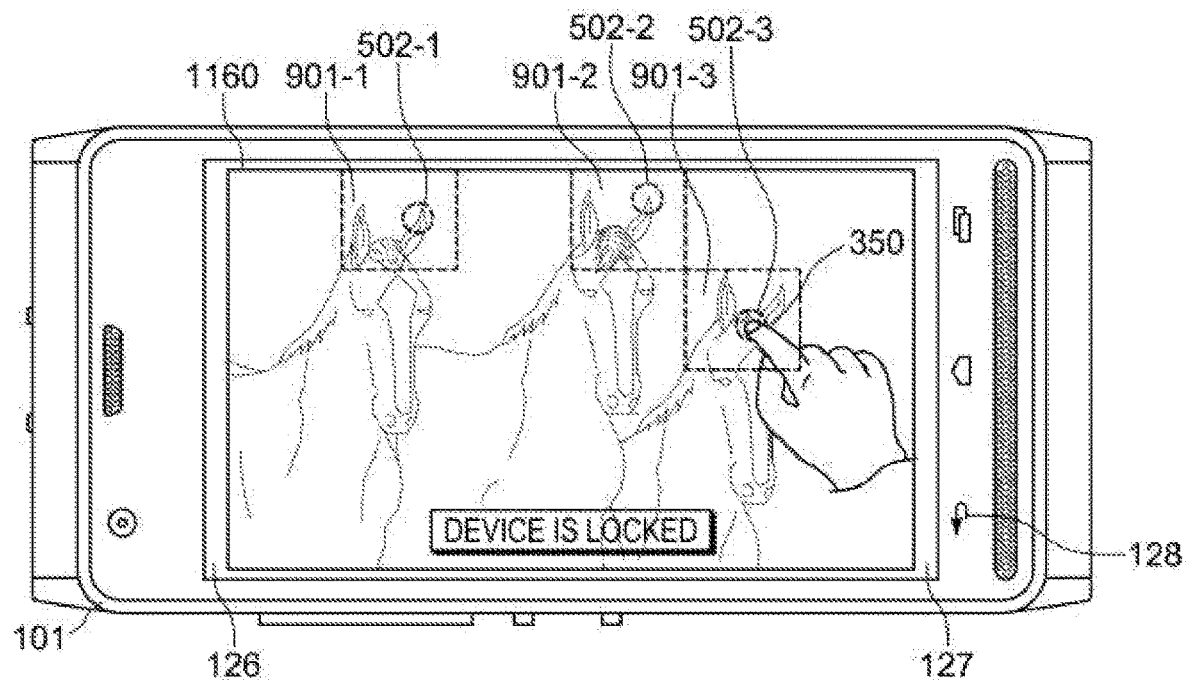
FIG. 13 depicts the device of FIG. 1 generating the watermarked digital image accordance, and receiving fingerprint information at each of one or more given areas in accordance with some embodiments.

Indeed, attention is directed to FIG. 13 which is substantially similar to FIG. 5, with like elements having like numbers. However, in FIG. 13, the device 101 is locked and the controller 120 is generating a notification at the display device 126 indicating such (e.g. DEVICE IS LOCKED"). The controller 120 is furthermore generating (e.g. at the block 1202), at the display device 126, the image 1160 that includes, in the one or more given areas 901-1, 901-2, 901-3 respective image-embedded fingerprint information as described above. Furthermore, in FIG. 13, the finger 350 has touched the portions 502 of the touch screen 127 in the same sequences as described above with respect to FIG. 5. In contrast to FIG. 5, however, no grid is provided at the image 1160. However, the image 1160 otherwise appears similar to the image 160 depicted in FIG. 5.

Indeed, the image 1160 generated at the display device 126 in FIG. 13 represents a screen for gaining access to the device 101. It is assumed that the user to whom the finger 350 belongs has previously generated the image 1160 and/or has knowledge of where the given areas 901 are located, as well as a sequence in which they are to be touched to cause the access process 150 to be implemented. As such, the user is in possession of at least two items that may be used for two-factor authentication: the fingerprint of the finger 350, and knowledge of the location of the given areas 901. Indeed, in the depicted example, the user is in further possession of a third item that may be used for three-factor authentication: knowledge of the sequence that the given areas 901 were touched when the image 1160 was generated.

It is furthermore assumed in FIG. 13 that the touch screen 127 is acquiring user-fingerprint information representing the fingerprint of the finger 350 as the touch screen 127 is generally configured to detect fingerprints.

Figure 14:
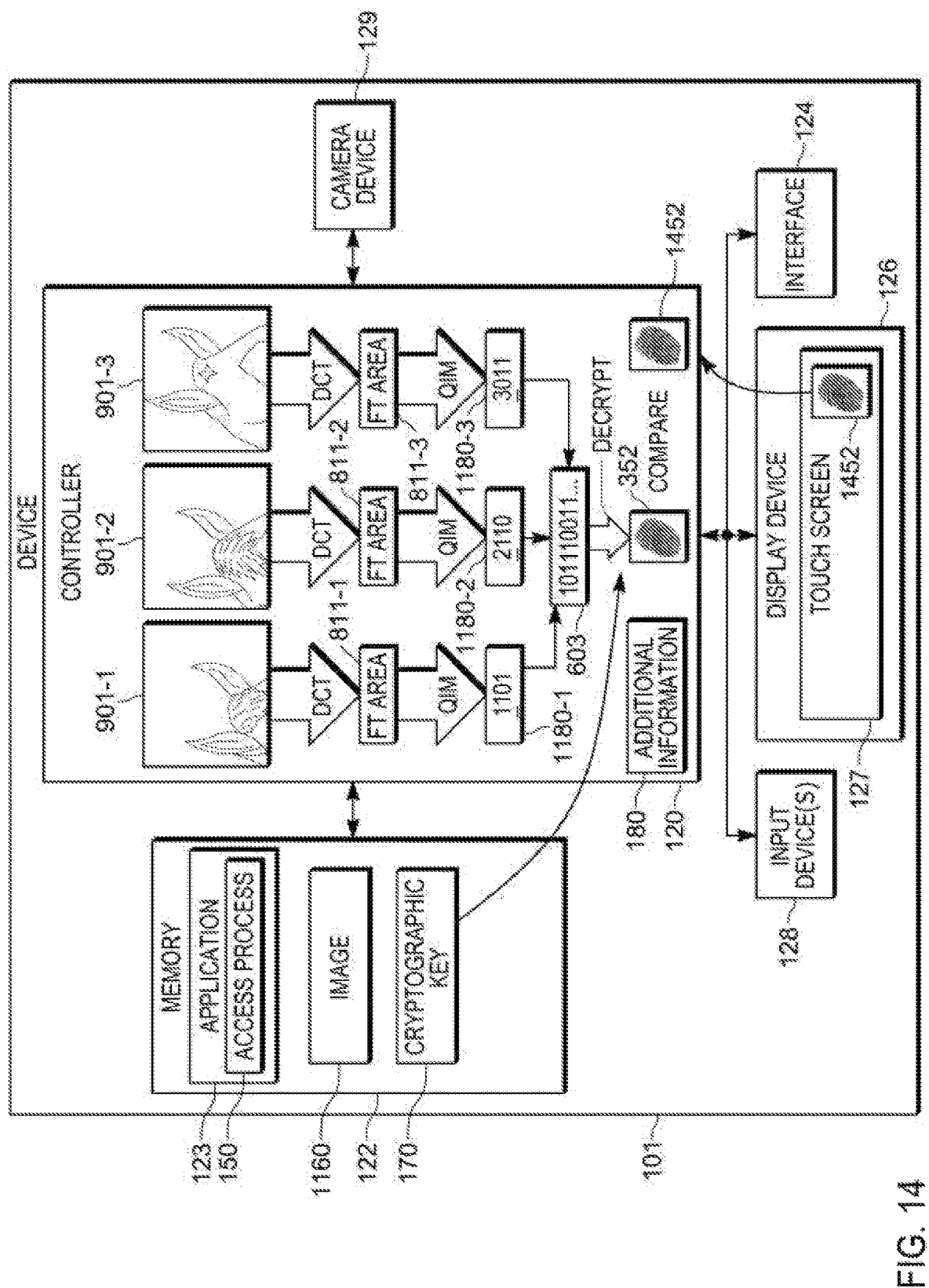
FIG. 14 depicts the device of FIG. 1 extracting the image-embedded fingerprint information from the watermarked digital image in accordance with some embodiments.

Attention is next directed to FIG. 14, which is substantially similar to FIG. 2, with like elements having like numbers. However, in FIG. 14, the memory 122 stores the image 1160 that includes the image-embedded fingerprint information 1180. As depicted, the additional information 180 is not stored at the memory 122, but may be embedded in the image 1160 as described above. For example, after the image 1160 is generated, the additional information 180 may be deleted to prevent unauthorized access thereto.

As also depicted in FIG. 14, the controller 120 has detected (e.g. at the block 1204), at one or more of portions 502 of the touch screen 127 respectively corresponding to the one or more given areas 901, user-fingerprint information 1452 representing a fingerprint of the finger 350. The user-fingerprint information 1452 is similar to the user-fingerprint information 352 and may comprise fingerprint data and/or digital fingerprint data. Furthermore, as the finger 350 has touched the touch screen 127 three times, the user-fingerprint information 1452 may be an average of each of three sets of user-fingerprint information generated at each touch of the touch screen 127.

As also depicted in FIG. 14, the controller 120 has extracted the areas 901 in the order they were touched by the finger 350. The controller 120 then uses a process similar to that described above with respect to FIG. 7, FIG. 8 and FIG. 9, but in reverse, to extract the image-embedded fingerprint information 1180 from the areas 901.

For example, as depicted, the controller 120 transforms each of the one or more given areas 901 of the image 1160 from a spatial domain to a frequency domain to generate, for example the corresponding information-encoded frequency-transformed areas 811 (labelled "FT Area" in FIG. 14). As depicted the controller 120 transforms each of the one or more given areas 901 of the image 1160 from a spatial domain to a frequency domain using a discrete cosine transform (DCT) and/or the same transform process used at the block 408 of the method 400.

The controller 120 then decodes the image-embedded fingerprint information 1180 from each of the one or more given areas 901 after the transforming, for example by using quantization index modulation (QIM) and/or the same process used at the blocks 410, 412 of the method 400 (and/or the inverse thereof).

As depicted, each set of the image-embedded fingerprint information 1180 includes a respective sequence number of a sequence in which the user-fingerprint information is to be received at the one or more portions of the touch screen 127.

The controller 120 may hence check that the sequence number corresponds to the order in which the area 901 were touched. For example, the numbers "1", "2" and "3", as underlined in the image-embedded fingerprint information 1180, are compared to the order that the corresponding areas 901 were touched; when the sequence of the numbers "1", "2" and "3" does not correspond to the sequence that the areas 901 were touched, the method 1200 may end (e.g. the access process 150 is not implemented). However, when the sequence of the numbers "1", "2" and "3" corresponds to the sequence that the areas 901 were touched, the method 1200 continues.

In other words, in the depicted example embodiments, the image-embedded fingerprint information 1180 includes a sequence number of a sequence in which the user-fingerprint information 1452 is to be received at the one or more portions 502 of the touch screen 127 for a successful comparison to occur between the user-fingerprint information 1452 and the image-embedded fingerprint information 1180.

For example, the image-embedded fingerprint information 1180 is combined by removing the sequence numbers "1", "2" and "3 and combining the image-embedded fingerprint information 1180 into the information 603.

Put yet another way, in embodiments where the one or more given areas 901 include two or more areas 901, the controller is further configured to extract the image-embedded fingerprint information 1180 from the image 1160 by: combining at least a portion of the image-embedded fingerprint information 1180 from each of the two or more areas 901 based on a respective sequence number (e.g. the numbers "1", "2", "3" as described above) encoded in each set of the image-embedded fingerprint information 1180, the respective sequence number indicative of an order in which the user-fingerprint information is to be received at the one or more given areas for a successful comparison to occur between the user-fingerprint information 1452 and the image-embedded fingerprint information 1180.

When the information 603 is encrypted, the controller 120 decrypts the information 603 after the decoding, for example using the cryptographic key 170. Put another way, as the image-embedded fingerprint information 1180 represents the information 603, the image-embedded fingerprint information 1180 may also be referred to as being encrypted; hence when the image-embedded fingerprint information 1180, and the like, is encrypted, the controller 120 decrypts the image-embedded fingerprint information 1180 after the decoding.

The decryption results in the user-fingerprint information 352 being decoded at the controller 120 from the image-embedded fingerprint information 1180. As depicted, the additional information 180, if any, is also decrypted. In other embodiments, when the additional information 180 was not encrypted and combined with the information 603, prior to decryption of the encrypted portion of information 603, the unencrypted additional information 180 may be extracted from the unencrypted portion of the information 603.

As also depicted in FIG. 14, the controller 120 then implements (e.g. at the block 1206 of the method 1200) a comparison between the user-fingerprint information 352 decoded from the image-embedded fingerprint information 1180 and the user-fingerprint information 1452 received at the touch screen 127. As heretofore described, in example embodiments, the image-embedded fingerprint information 1180 comprises the user-fingerprint information 352 which, in turn, comprises fingerprint data. Furthermore, user-fingerprint information 1452 received at the touch screen 127 also comprises fingerprint data.

Hence, in these example embodiments, the controller 120 is further configured to implement the comparison between the user-fingerprint information 352 decoded from the image-embedded fingerprint information 1180 by: comparing the user-fingerprint information 1452 with the fingerprint data from the user-fingerprint information 352. Furthermore, as depicted in FIG. 15, which is substantially similar to FIG. 14, with like elements having like numbers, the comparison between the user-fingerprint information 352 decoded from the image-embedded fingerprint information 1180 is successful when a match occurs between the user-fingerprint information 1452 and the fingerprint data from the user-fingerprint information 352.

Figure 15:
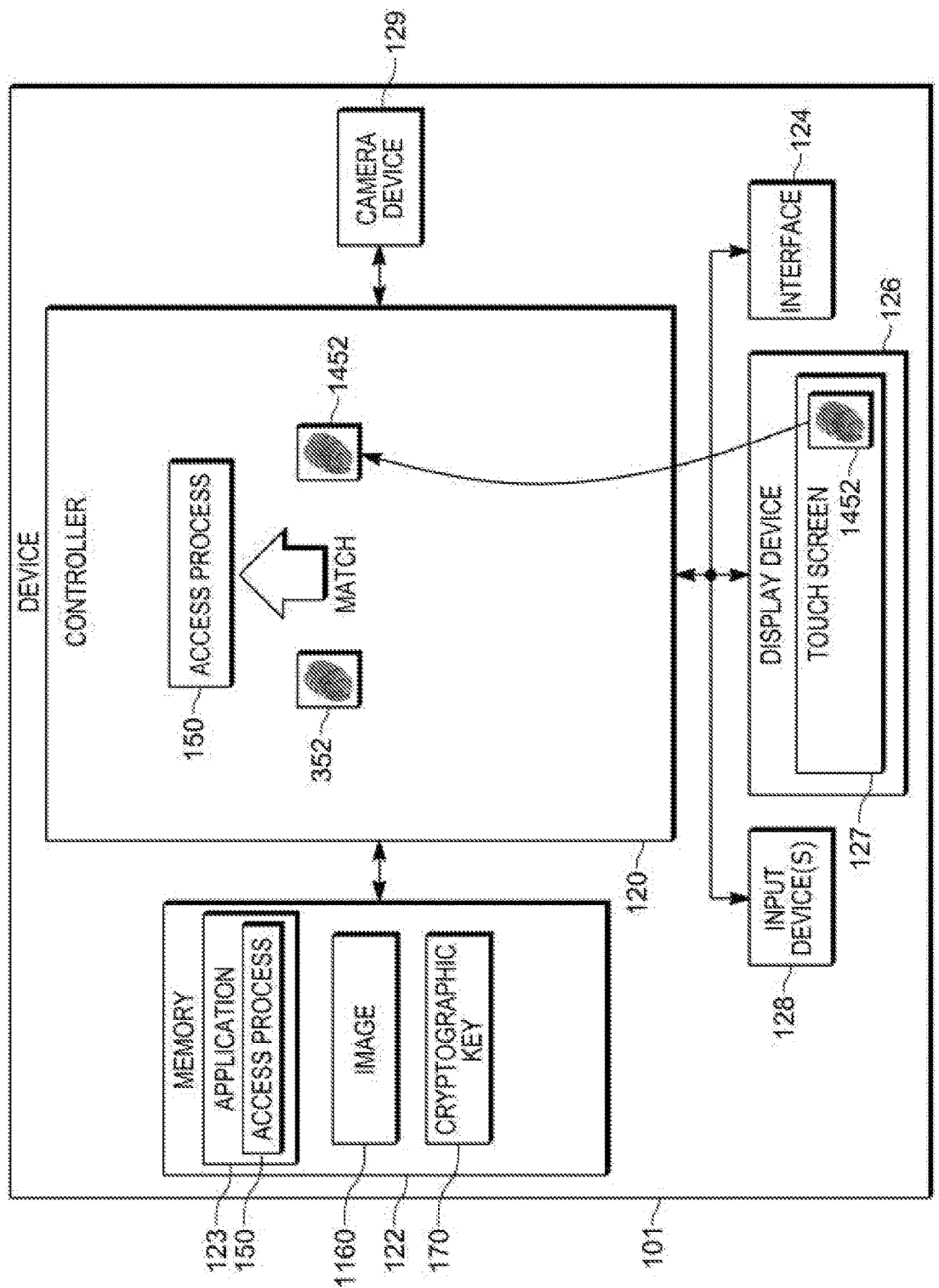
FIG. 15 depicts the device of FIG. 1 comparing the image-embedded fingerprint information with the fingerprint information received from the touch screen in accordance with some embodiments.
Figure 16:
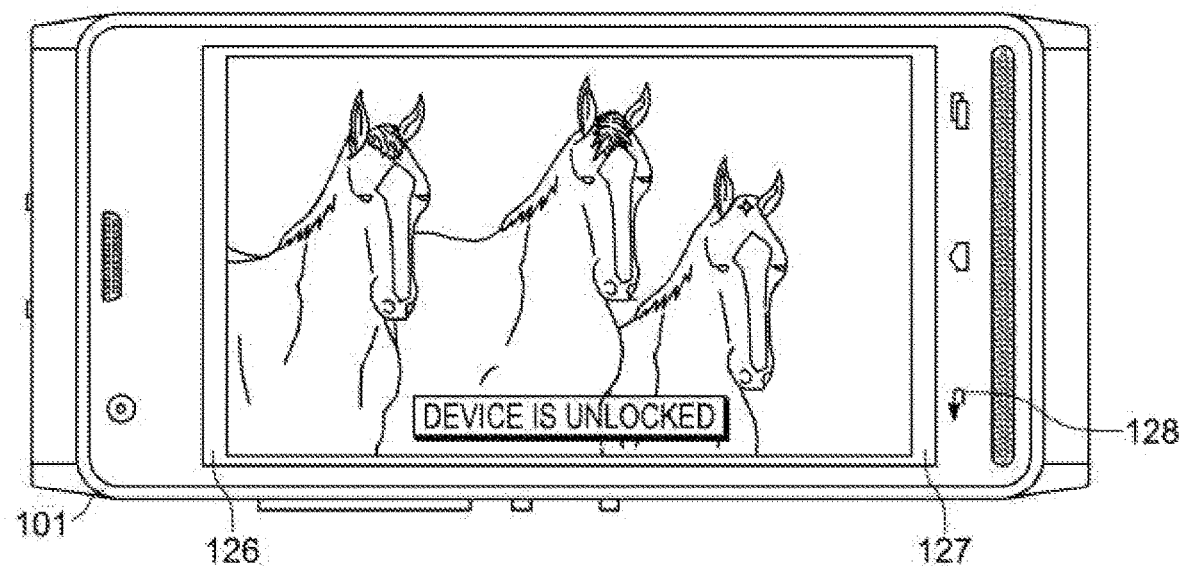
FIG. 16 depicts the device of FIG. 1 after an access process has been implemented in accordance with some embodiments.

In any event, when a match occurs (e.g. a "YES" decision at the block 1208), the access process 150 is implemented (e.g. at the block 1210), as also depicted in FIG. 15. For example, the access process 150 may include the controller 120 providing access to the device 101. For example, assuming that the device 101 is locked prior to the access process 150 being implemented, the controller 120 unlocks the device 101; indeed, in some embodiments, with reference to FIG. 16 (substantially similar to FIG. 13 with like elements having like numbers), the controller 120 may generate a notification at the display device 126 indicating such (e.g. DEVICE IS UNLOCKED"). Thereafter, the user may access the device 101. The access process 150 may further include providing access to the additional information 180, as well as any files, and the like, accessible using an indicator and/or a network address in the additional information 180.

However, when the match is unsuccessful (e.g. a "NO" decision at the block 1208), the device 101 remains locked (and/or the additional information 180 remains inaccessible), and the method 1200 ends at the block 1209.

Hence, for successful match to occur, the user to whom the finger 350 belongs must be in possession of: a fingerprint that will match the fingerprint data from the user-fingerprint information 352; knowledge of the location of the areas 901; and a sequence in which the areas 901 are to be touched (assuming two or more areas 901). Such a scheme may increase security in fingerprint two-factor authorization, or three-factor authentication, without, for example, requiring that the device 101 have access to a network.

Other embodiments are within the scope of the present specification. For example, when each set of the image-embedded fingerprint information 1180 is the same and each comprises the user-fingerprint information 352 (e.g. not divided into the pieces 803), and when the one or more given areas 901 include two or more areas 901, the controller 120 may be further configured to: implement the comparison (e.g. at the block 1206 of the method 1200) between the user-fingerprint information 1452 and the image-embedded fingerprint information 1180 from each of the one or more given areas 901. In other words, a comparison occurs between the user-fingerprint information 1452 received from the touch screen 127 and each set of the fingerprint data of the user-fingerprint information 352 embedded in image-embedded fingerprint information 1180; a match should occur between the user-fingerprint information 1452 and each set of the fingerprint data for a determination of success at the block 1208 of the method 1200.

Indeed, in some of these embodiments, each area 901 may have different fingerprint data encoded therein (e.g. from different fingers of a user); hence at each of the areas 901, the user touches the touch screen 127 with a different corresponding finger to cause the access process 150 to be implemented, assuming that a match occurs between each set of the user-fingerprint information 1452 received from the touch screen 127 for each finger, and each corresponding set of the fingerprint data of the user-fingerprint information 352 embedded in image-embedded fingerprint information 1180.

In yet further embodiments an image may include fingerprint data encoded therein from different users. Hence, a single image may be used for authentication of more than one user. In some of these embodiments, the areas where the different fingerprint information is embedded are separated by a given distance, for example a distance that prevents distortion of the image due to digital watermarking data in the image. For example, in some digital watermarking techniques, embedding data within a given distance in an image may result in distortion of the image in the watermarked region that is visible to a human vision system; hence, the areas where the different fingerprint information is embedded are separated by a given distance which prevents such distortion.

Indeed, with brief reference back to FIG. 5, when the grid 500 is provided, a resolution of the grid may be selected which also prevents such distortion (e.g. such that the areas 501 are of a size such that any digital watermarking distortion due to the image-embedded fingerprint information 1180 being later embedded in the image 1160 is not visible to a human vision system).

In some embodiments, the method 400 and/or the method 1200 may be at least partially implemented at a computing device different from the device 101, including, but not limited to, a server.

Figure 17:
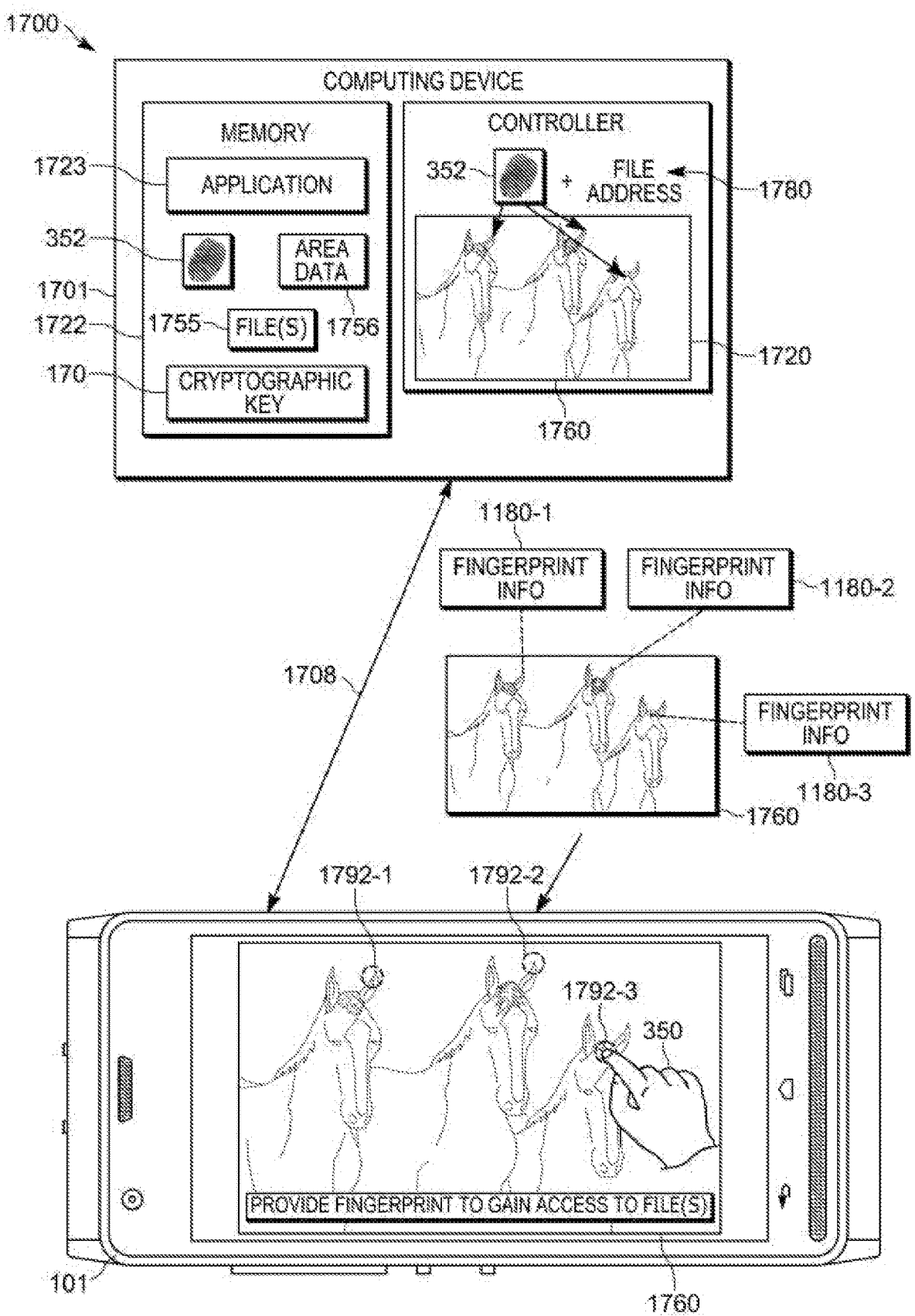
FIG. 17 depicts a computing device, different from the device of FIG. 1, generating a watermarked digital image and providing the watermarked digital image accordance to the device of FIG. 1 accordance in accordance with some embodiments.
Figure 18:
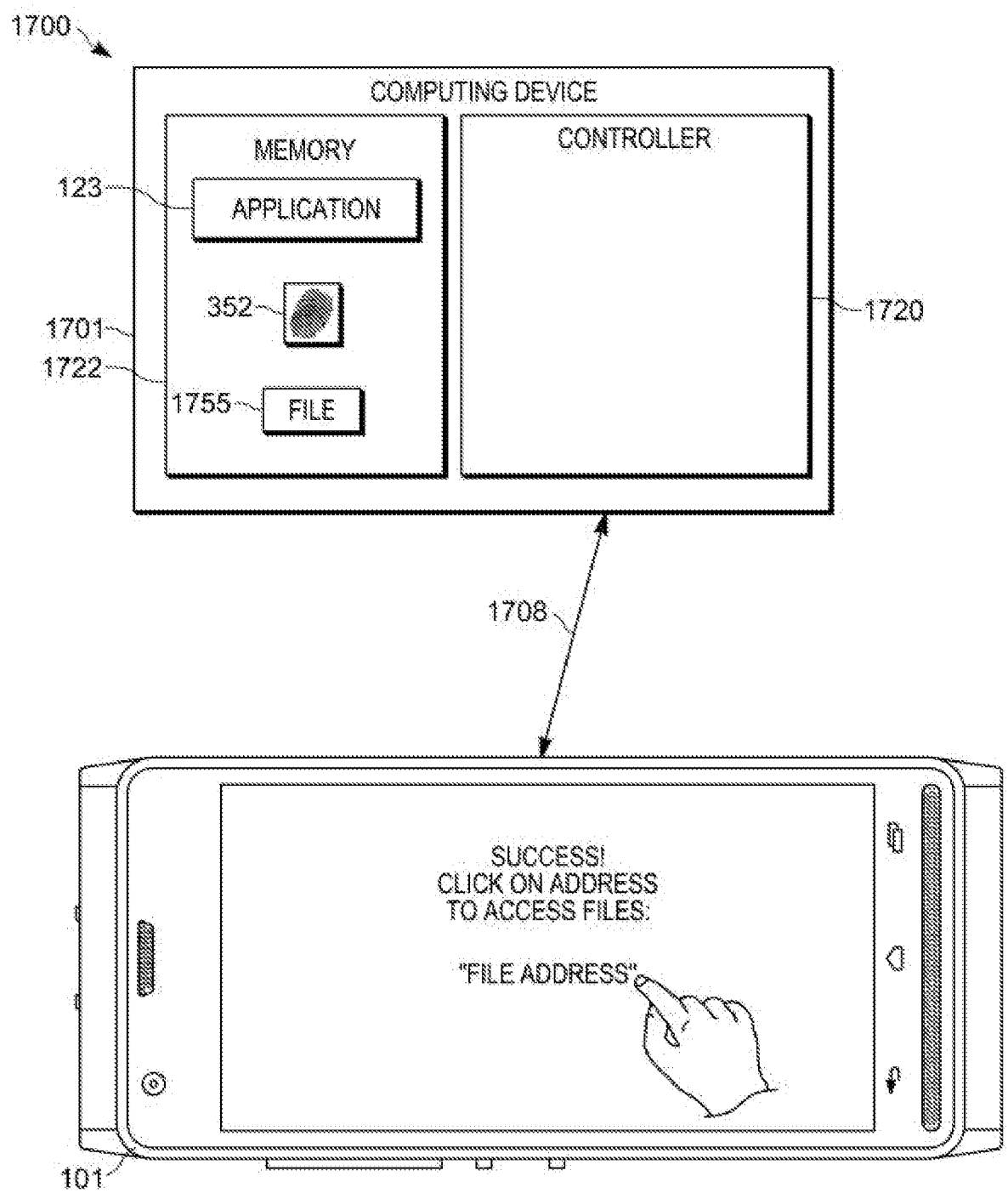
FIG. 18 depicts the device of FIG. 1 implementing an access process that includes accessing files at a computing device different from the device of FIG. 1 in accordance with some embodiments.

For example, attention is directed to FIG. 17 and FIG. 18, each of which depicts a system 1700 that includes the device 101 and a computing device 1701 (e.g. a server) in communication using a link 1708 that may include, but is not limited to, a wireless link implemented at least in part using the interface 124 of the device 101.

As depicted, the computing device 1701 includes a controller 1720 and a memory 1722, storing an application 1723, that are respectively similar to the controller 120, the memory 122, and the application 1723, but adapted for a computing device and/or server environment. While not depicted, the computing device 1701 further includes a communication interface, similar to the interface 124 but adapted for a computing device and/or server environment, as well as any other components suitable for a computing device and/or server environment.

Furthermore, the memory 1722 may be located at another computing device and/or server accessible to the controller 1720.

As depicted, the memory 1722 stores a copy of the user-fingerprint information 352 which may be provisioned at the computing device 1701 by the device 101 transmitting the user-fingerprint information 352 to the computing device 1701 and/or a user of the device 101 providing the user-fingerprint information 352 to an entity associated with computing device 1701. For example, the computing device 1701 may be operated by an entity of which the user is an employee and/or a customer and the like, the entity storing a record of the user-fingerprint information 352, for example in association with an identifier (not depicted) of the device 101 and/or the user. As depicted, the memory 1722 further stores a copy of the cryptographic key 170 for example in association with the identifier (not depicted) of the device 101 and/or the user.

As depicted, the memory 1722 further stores at least one file 1755 and/or a location (e.g. a network address) of the at least one file 1755 (e.g. stored at an another computing device and/or another server) to which a user of the device 101 is to be granted access, as well as area data 1756 defining areas of an image 1760 that are to be encoded with the user-fingerprint information 352 by the controller 1720 in order to provide the image 1760 to the device 101 to grant access to the at least one file 1755. The area data 1756 may be provisioned at the computing device 1701 when the user-fingerprint information 352 is provisioned and/or at a later time. For example, when the user of the device 101 provides their fingerprint to the computing device 1701, the user may also select one or more given areas of an image template and/or the image 1760 to be used for granting access to files, and the like; such a selection is stored as the area data 1756.

As such, the controller 1720 may execute the application 1723 causing the computing device 1701 to implement a portion of the method 400, adapted for use with the user-fingerprint information 352 and the area data 1756 being stored at the memory 1722, and further adapted for use with a network address 1780 of the at least one file 1755 (e.g. at the memory 1722 and/or at another computing device) being used in place of the additional information 180. Hence, for example, at the block 404, rather than detect user-fingerprint information 352 at a touch screen, the controller 1720 retrieves the user-fingerprint information 352 from the memory 1722. Further, at the block 404, the areas of the image 1760 to be transformed are selected using the area data 1756. The method 400 otherwise proceeds as described above and, as depicted, in FIG. 17, the user-fingerprint information 352 and the network address 1780 are encoded in the image 1760 as the image-embedded fingerprint information 1180 at similar areas as described above with respect to FIG. 5 to FIG. 11.

The encoded image 1760 is transmitted to the device 101 via the link 1708, where the controller 120 implements the method 1200 and generates the image 1760 at the display device 126 with optional instructions (as depicted, the text "Provide Fingerprint to Gain Access to File(s)"), however any instructions may be generic so as to not provide hints on the areas of the image to be touched and/or an order thereof.

As depicted, the finger 350 has successfully touched all three portions 1792-1, 1792-2, 1792-3 of the touch screen 127, and in the sequence in which user-fingerprint information detected by the touch screen 127 is to be received at the one or more portions of the touch screen for a successful comparison to occur. Hence, the device 101 implements the access process 150 which includes providing access to the at least one file 1755. For example, the device 101 decodes the network address 1780 of the at least one file 1755 and, as depicted in FIG. 18, provides the network address 1780 (and/or an alias) at the display device 126 such that the at least one file 1755 may be accessed, for example, by "clicking" on the "FILE ADDRESS". In other words, in these embodiments, the access process 150 comprises providing access to the at least one file 1755.

In some embodiments, the network address 1780 may be to only a portion of the at least one file 1755. For example, at least one file 1755 may include one or more of a video and images, and the image-embedded fingerprint information 1180 in the image 1760 may include an identifier of one or more of: at least a portion of a video viewable after the access process 150 is implemented; one or more images viewable after the access process 150 is implemented; and an album (e.g. of images in the at least one file 1755)

viewable after the access process 150 is implemented. Indeed, as depicted, the image-embedded fingerprint information 1180 includes the address 1780 of a device (e.g. the computing device 1701) upon which one or more of the video and the one or more images are stored (e.g. at the memory 1722).

In yet further embodiments, at least a portion of at least one file 1755 may be transmitted to the device 101 with the image 1760 (e.g. as separate files in an email, a text message, an MMS (multimedia messaging service) message, and the like), for example, in an encrypted format, and the at least a portion of at least one file 1755 received at the device 101 may be decrypted in the access process 150. Indeed, in some of these embodiments, image-embedded fingerprint information 1180 may include a cryptographic key for decrypting any files transmitted with the image 1760.

Referring briefly back to FIG. 17, in some embodiments the area data 1756 may be associated with more than one user, for example a group of users associated with a group identifier. In such embodiments, each of the users with which the area data 1756 is associated, has respective user-fingerprint information (e.g. similar to information 352) stored in association with the area data 1756 and, for example, a user identifier. Hence, each user associated with the area data 1756 touches the same given areas of an, similar to the image 1760, as defined by common area data 1756, but having the respective user-fingerprint information embedded therein.

In yet further embodiments, the user-fingerprint information 352 is not embedded in an image at the computing device 1701. Rather, a network address of the user-fingerprint information 352 is embedded in an image.

Figure 19:
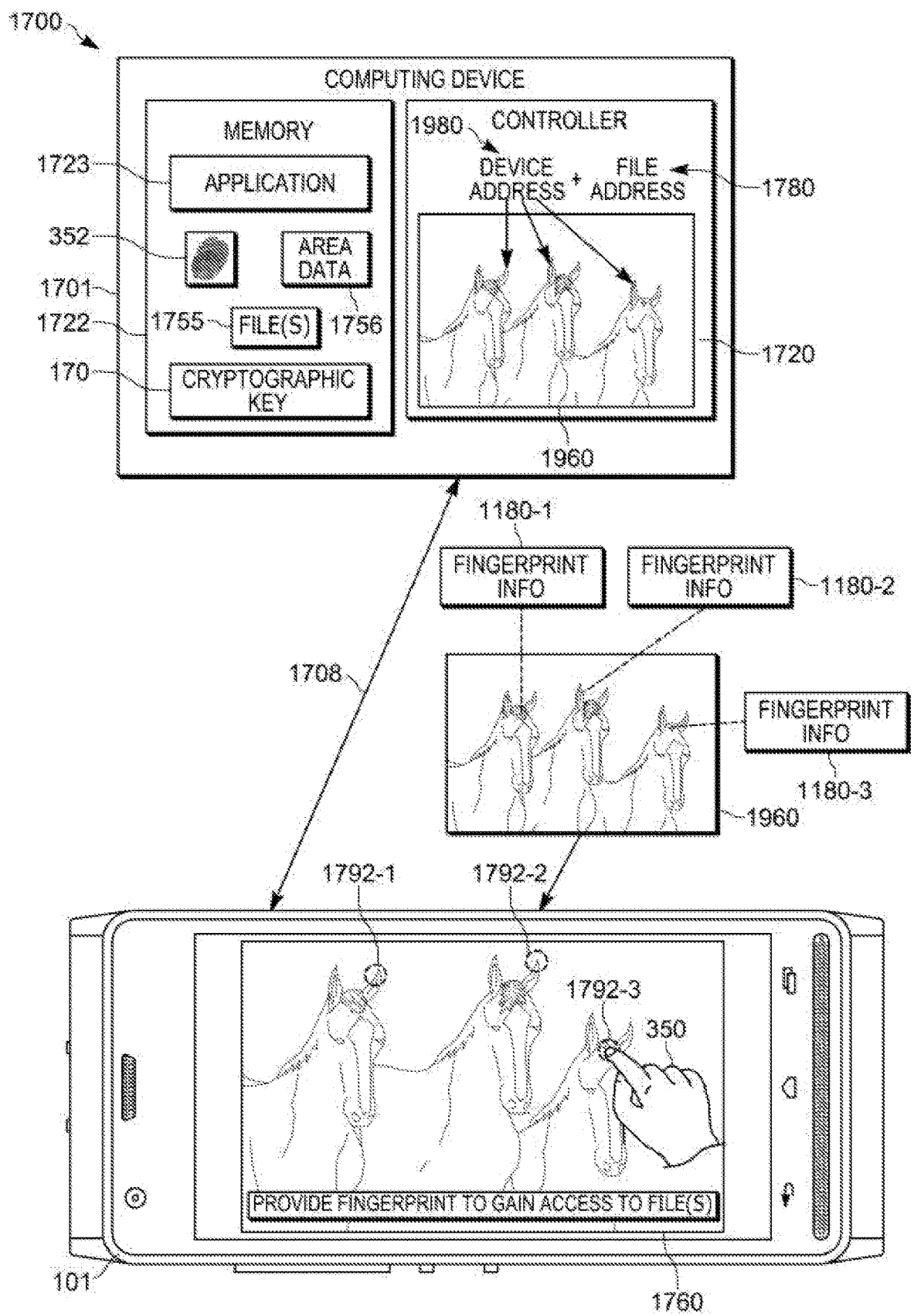
FIG. 19 depicts a computing device, different from the device of FIG. 1, generating a watermarked digital image that includes a device address and providing the watermarked digital image accordance to the device of FIG. 1 accordance in accordance with some embodiments.
Figure 20:
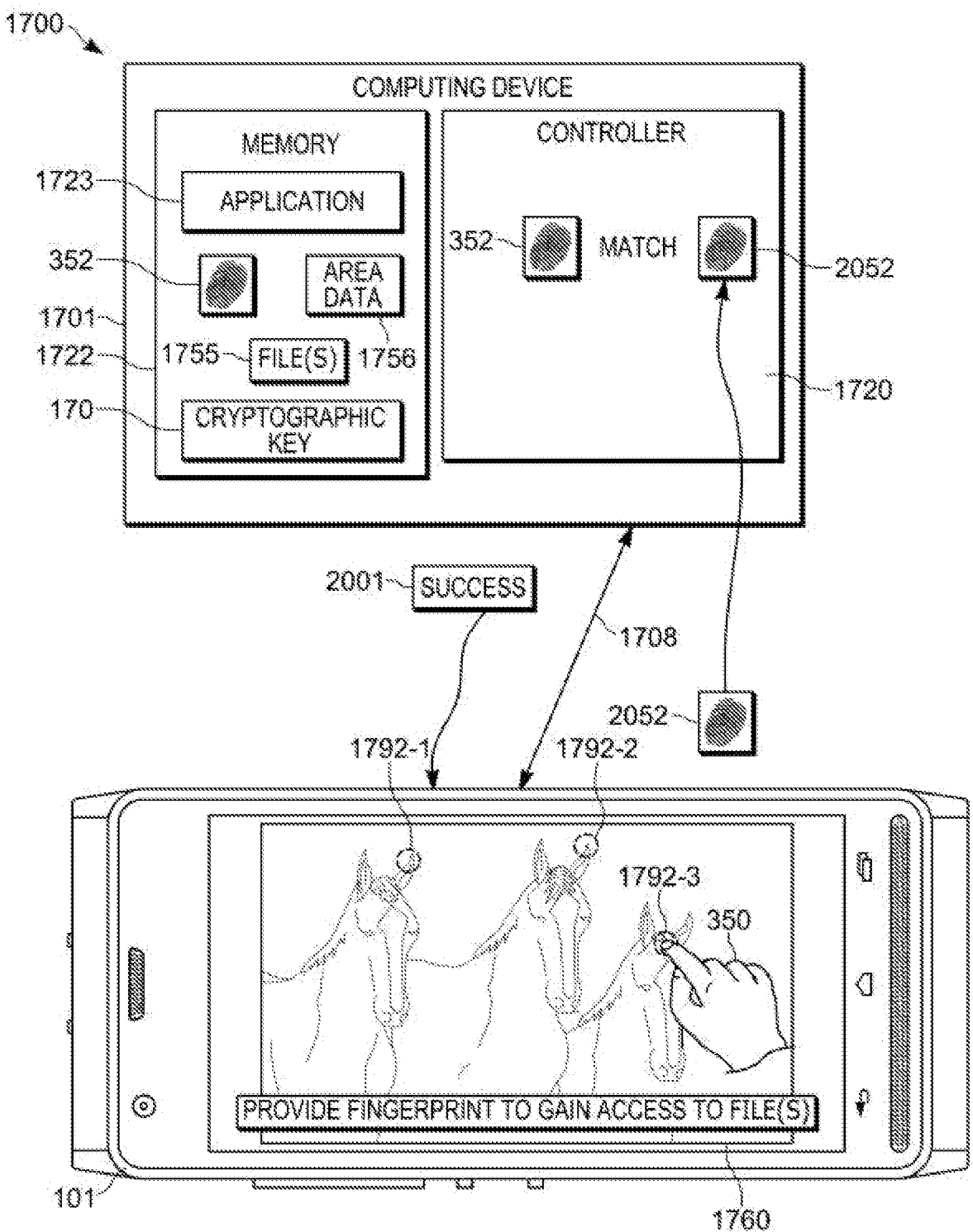
FIG. 20 depicts the computing device of FIG. 19 comparing image-embedded fingerprint information with the fingerprint information received from the touch screen in accordance with some embodiments.

For example, attention is next directed to FIG. 19 and FIG. 20, each of which is substantially similar to FIG. 17 with like elements having like numbers. However, with reference to FIG. 19, the controller 1720 embeds a network address 1980 of the computing device 1701, with the network address 1780 of the at least one file 1755, in an image 1960 rather than the user-fingerprint information 352, and transmits the image 1960 to the device 101. Hence, in these embodiments, the computing device 1701 is implementing the method 400, however the block 410 is omitted and the block 412 is implemented to embed the network address 1980 of the computing device 1701 (e.g. with the network address 1780 of the at least one file 1755) as the additional information in the image-embedded fingerprint information 1180.

The controller 120 of the device 101 implements the method 1200, for example upon receipt of the image 1960. With reference to FIG. 20, it is assumed that the finger 350 has successfully touched the portions 1792-1, 1792-2, 1792-3 of the touch screen 127 in the correct sequence and extracted the network address 1980 of the computing device 1701 (e.g. similar to extracting the user-fingerprint information 352 and/or the additional information 180 depicted in FIG. 14).

However, at the block 1206, to implement the comparison between user-fingerprint information 2052 received at the touch screen 127 (e.g. similar to the user-fingerprint information 1452) and the image-embedded fingerprint information 1180, the controller 120 of the device 101 transmits the user-fingerprint information 2052 to the computing device 1701 using the network address 1980. At the computing device 1701, the controller 1720 compares the user-fingerprint information 2052 with the user-fingerprint information 352 to determine whether there is a match; assuming a match (as depicted), the computing device 1701 transmits a notification 2001 of a successful match to the device 101, where the controller 120, at the block 1208 determines that the comparison is successful and implements an access process 150 to access the at least one file 1755, as described above. When the match is not successful the computing device 1701 transmits a notification of a unsuccessful match to the device 101, where the controller 120, at the block 1208 determines that the comparison is unsuccessful and the method 1200 ends at the block 1209.

Hence, put another way, in the example embodiment of FIG. 19 and FIG. 20, the image-embedded fingerprint information 1180 comprises a network address 1980 of the computing device 1701, and the controller 120, of the device 101, is further configured to implement the comparison between the user-fingerprint information 2052 and the image-embedded fingerprint information 1180 by: transmitting data representing the user-fingerprint information 2052 to the computing device 1701 at the network address 1980 for comparison with fingerprint data (e.g. the user-fingerprint information 352) accessible to the computing device 1701; and determining that the comparison between the user-fingerprint information 2052 and the image-embedded fingerprint information 1180 is successful when a notification 2001 is received from the computing device 1701 indicating a match between the user-fingerprint information 2052 and the fingerprint data.

Indeed, similar example embodiments may be used to provide access to, and/or unlock, the device 101. For example, the method 1200 may proceed as described with reference to FIG. 14 to FIG. 16, but the comparison at the block 1206 may occur by transmitting user-fingerprint information received at the touch screen 127 to the computing device 1701 for comparison.

Furthermore, the memory 1722 may store a plurality of user-fingerprint information, each similar to the user-fingerprint information 352, but for different users using devices similar to the device 101. The plurality of user-fingerprint information may be stored in association with respective device identifiers and/or user identifiers.

In the embodiments depicted in FIG. 19 and FIG. 20, the computing device 1701 may transmit the image 1960 to a plurality of devices to which access to at least a portion of the at least one file 1755 may be granted, and each of the devices may transmit user-fingerprint information received at respective touch screens to the computing device 1701, with an identifier of a respective device and/or a respective user. The controller 1720 may perform a comparison with the received user-fingerprint information and the user-fingerprint information stored in the memory 1722 using the received device identifier and/or user identifier.

Furthermore, in these embodiments, different devices may be granted access to different portions of the at least one file 1755. For example, using a customized network address 1780 for particular files 1755 and/or portions thereof (e.g. customized for a particular device) a first device may be granted access to a first portion of a video and/or a first portion of a set of images, while a second device may be granted access to a second portion of a video and/or a second portion of a set of images and/or different videos and/or different images as the first device.

In some embodiments, the area data 1756 is common for each of the plurality of user-fingerprint information (e.g. the area data 1756 may comprise a common template associated with a plurality of device identifiers and/or user identifiers).

Alternatively, the area data may be different for each of the plurality of user-fingerprint information; for example, each plurality of device identifiers and/or user identifiers may be associated with area data, similar to area data 1756, such that each user touches different regions of an image for authentication.

Yet further embodiments are within the scope of the present specification. For example, in some embodiments, a portion of the image in which the image-embedded fingerprint information is embedded may be "blurred out" and the access process may comprise unblurring the blurred portion. Such "blurred out" portions may include, but are not limited to, human faces, names, sensitive information, and the like. Such "blurred out" portions may further include, but are not limited to, portions of the image where the image-embedded fingerprint information is not embedded and/or portions of the image where the image-embedded fingerprint information is embedded.

Similarly, in some embodiments, the image in which the image-embedded fingerprint information may comprise one or frames of a video, with a portion of the video being encrypted and/or unplayable until the method 1200 is successfully implemented; for example, when a "YES" decision occurs at the block 1208 the portion of the video us unencrypted and/or becomes playable. Indeed, in these embodiments, different portions of the video may be made accessible to different devices and/or different frames of the video may be embedded with different fingerprint information from different users.

In any event, described herein are systems, devices and methods for at least two-factor authentication are provided, in which specific fingerprint information is received at specific portions of a touch screen corresponding to specific regions of a generated image, to cause an access process to be implemented. In some embodiments, the embodiment of the access process is further dependent on a sequence in which the fingerprint information is received at a touch screen.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A device comprising:
a display device including a touch screen configured to detect fingerprints; and, a controller configured to:
render, at the display device, an image that includes, in one or more given areas, image-embedded fingerprint information;
detect, at one or more portions of the touch screen respectively corresponding to the one or more given areas, user-fingerprint information representing a fingerprint;
implement a comparison between the user-fingerprint information and the image-embedded fingerprint information; and
when the comparison between the user-fingerprint information and the image-embedded fingerprint information is successful, implement an access process,
wherein the image-embedded fingerprint information includes one or more of
a sequence number of a sequence in which the user-fingerprint information is to be received at the one or more portions of the touch screen for a successful comparison to occur between the user-fingerprint information and the image-embedded fingerprint information;
at least a portion of a video viewable after the access process is implemented;
one or more images viewable after the access process is implemented;
an album viewable after the access process is implemented; and
an address of a device upon which one or more of the video and the one or more images are stored.

2. The device of claim 1, wherein the image-embedded fingerprint information comprises fingerprint data, and the controller is further configured to implement the comparison between the user-fingerprint information and the image-embedded fingerprint information by:
comparing the user-fingerprint information with the fingerprint data,
wherein the comparison between the user-fingerprint information and the image-embedded fingerprint information is successful when a match occurs between the user-fingerprint information and the fingerprint data.

3. The device of claim 1, wherein the image-embedded fingerprint information comprises a network address of a computing device, and the controller is further configured to implement the comparison between the user-fingerprint information and the image-embedded fingerprint information by:
transmitting data representing the user-fingerprint information to the computing device at the network address for comparison with fingerprint data accessible to the computing device; and
determining that the comparison between the user-fingerprint information and the image-embedded fingerprint information is successful when a notification is received from the computing device indicating a match between the user-fingerprint information and the fingerprint data.

4. The device of claim 1, wherein the controller is further configured to extract the image-embedded fingerprint information from the image by:
transforming each of the one or more given areas of the image from a spatial domain to a frequency domain;
decoding the image-embedded fingerprint information from each of the one or more given areas after the transforming; and,
when the image-embedded fingerprint information is encrypted, decrypting the image-embedded fingerprint information after the decoding.

5. The device of claim 4, wherein the controller is further configured to extract the image-embedded fingerprint information from the image by:
when the one or more given areas include two or more areas, combining at least a portion of the image-embedded fingerprint information from each of the two or more areas based on a respective sequence number encoded in each set of the image-embedded fingerprint information, the respective sequence number indicative of an order in which the user-fingerprint information is to be received at the one or more given areas for a successful comparison to occur between the user-fingerprint information and the image-embedded fingerprint information.

6. The device of claim 1, wherein, when the one or more given areas include two or more areas, the controller is further configured to:
implement the comparison between the user-fingerprint information and the image-embedded fingerprint information from each of the one or more given areas.

7. The device of claim 1, wherein the image-embedded fingerprint information is encrypted and the comparison between the user-fingerprint information and the image-embedded fingerprint information includes decrypting the image-embedded fingerprint information.

8. The device of claim 1, wherein the access process comprises the controller providing access to a communication device.

9. A method comprising:
rendering, using a controller, at a display device, an image that includes, in one or more given areas, image-embedded fingerprint information, the display device including a touch screen configured to detect fingerprints;
detecting, at one or more portions of the touch screen respectively corresponding to the one or more given areas, user-fingerprint information representing a fingerprint;
implementing, using the controller, a comparison between the user-fingerprint information and the image-embedded fingerprint information; and
when the comparison between the user-fingerprint information and the image-embedded fingerprint information is successful, implementing, using the controller, an access process,
wherein the image-embedded fingerprint information includes one or more of
a sequence number of a sequence in which the user-fingerprint information is to be received at the one or more portions of the touch screen for a successful comparison to occur between the user-fingerprint information and the image-embedded fingerprint information;
at least a portion of a video viewable after the access process is implemented;

one or more images viewable after the access process is implemented;

an album viewable after the access process is implemented; and an address of a device upon which one or more of the video and the one or more images are stored.

10. The method of claim 9, wherein the image-embedded fingerprint information comprises fingerprint data, and the controller is further configured to implement the comparison between the user-fingerprint information and the image-embedded fingerprint information by:

comparing the user-fingerprint information with the fingerprint data, wherein the comparison between the user-fingerprint information and the image-embedded fingerprint information is successful when a match occurs between the user-fingerprint information and the fingerprint data.

11. The method of claim 9, wherein the image-embedded fingerprint information comprises a network address of a computing device, and the method further comprising implementing the comparison between the user-fingerprint information and the image-embedded fingerprint information by:

transmitting data representing the user-fingerprint information to the computing device at the network address for comparison with fingerprint data accessible to the computing device; and determining that the comparison between the user-fingerprint information and the image-embedded fingerprint information is successful when a notification is received from the computing device indicating a match between the user-fingerprint information and the fingerprint data.

12. The method of claim 9, further comprising extracting the image-embedded fingerprint information from the image by:

transforming each of the one or more given areas of the image from a spatial domain to a frequency domain;

decoding the image-embedded fingerprint information from each of the one or more given areas after the transforming; and, when the image-embedded fingerprint information is encrypted, decrypting the image-embedded fingerprint information after the decoding.

13. The method of claim 12, further comprising extracting the image-embedded fingerprint information from the image by:

when the one or more given areas include two or more areas, combining at least a portion of the image-embedded fingerprint information from each of the two or more areas based on a respective sequence number encoded in each set of the image-embedded fingerprint information, the respective sequence number indicative of an order in which the user-fingerprint information is to be received at the one or more given areas for a successful comparison to occur between the user-fingerprint information and the image-embedded fingerprint information.

14. The method of claim 9, wherein, when the one or more given areas include two or more areas, the method further comprises:

implementing the comparison between the user-fingerprint information and the image-embedded fingerprint information from each of the one or more given areas.

15. The method of claim 9, wherein the image-embedded fingerprint information is encrypted and the comparison between the user-fingerprint information and the image-embedded fingerprint information includes decrypting the image-embedded fingerprint information.

16. The method of claim 9, wherein the access process provides access to a communication device.

17. A method comprising:

rendering, using a controller, at a display device, an image that includes, in two or more given areas, image-embedded fingerprint information, the display device including a touch screen configured to detect fingerprints;

detecting, at two or more portions of the touch screen respectively corresponding to the two or more given areas, user-fingerprint information representing a fingerprint;

implementing, using the controller, a comparison between the user-fingerprint information and the image-embedded fingerprint information from each of the two or more given areas; and when the comparison between the user-fingerprint information and the image-embedded fingerprint information is successful, implementing, using the controller, an access process.

* * * * *